(12) United States Patent
Kim

(10) Patent No.: US 12,482,507 B2
(45) Date of Patent: *Nov. 25, 2025

(54) MEMORY DEVICE CONFIGURED TO GENERATE READ CURRENT BASED ON SIZE OF MEMORY CELL AND VALUE OF READ CURRENT ACTUALLY APPLIED TO MEMORY CELL

(71) Applicant: Samsung Electronics Co., Ltd., Suwon-si (KR)

(72) Inventor: Daeshik Kim, Suwon-si (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 226 days.

This patent is subject to a terminal disclaimer.

(21) Appl. No.: 18/329,215

(22) Filed: Jun. 5, 2023

(65) Prior Publication Data
US 2024/0062795 A1    Feb. 22, 2024

(30) Foreign Application Priority Data

Aug. 17, 2022   (KR) ........................ 10-2022-0102952

(51) Int. Cl.
   *G11C 11/16*   (2006.01)
(52) U.S. Cl.
   CPC ...... *G11C 11/1673* (2013.01); *G11C 11/1655* (2013.01); *G11C 11/1657* (2013.01); *G11C 11/1675* (2013.01)
(58) Field of Classification Search
   CPC .................................................... G11C 17/16
   See application file for complete search history.

(56) References Cited

U.S. PATENT DOCUMENTS

| | | | |
|---|---|---|---|
| 6,873,543 B2 | 3/2005 | Smith et al. |
| 6,990,015 B2 | 1/2006 | Honda et al. |
| 7,453,719 B2 | 11/2008 | Sakimura et al. |
| 7,813,166 B2 | 10/2010 | Jung et al. |
| 8,184,490 B2 | 5/2012 | Wang et al. |
| 8,693,273 B2 | 4/2014 | Yuh et al. |
| 8,902,628 B2 | 12/2014 | Ha et al. |
| 9,177,627 B2 | 11/2015 | Chen et al. |
| 9,406,367 B2 | 8/2016 | Chih et al. |
| 9,659,624 B1 | 5/2017 | Hendrickson et al. |
| 9,679,643 B1 | 6/2017 | Chou |
| 9,947,398 B1 | 4/2018 | Lin et al. |
| 10,163,479 B2 | 12/2018 | Berger et al. |
| 10,347,314 B2 | 7/2019 | Berger et al. |
| 10,460,056 B2 | 10/2019 | Gharia |
| 10,593,402 B2 | 3/2020 | Pyo et al. |

(Continued)

*Primary Examiner* — Douglas King
(74) *Attorney, Agent, or Firm* — Harness, Dickey & Pierce, P.L.C.

(57) ABSTRACT

Disclosed is a memory device which includes a memory cell array that includes a plurality of memory cells and divided into a first region and a second region, and a sensing circuit that generates a first read current for determining data stored in memory cells belonging to the first region from among the plurality of memory cells wherein the second region configured to store a value of the first read current determined based on a value of a reference resistance for distinguishing a parallel state and an anti-parallel state of a memory cell where the data is stored and a value of an initial read current applied to the memory cell.

13 Claims, 22 Drawing Sheets

(56) References Cited

U.S. PATENT DOCUMENTS

| | | |
|---|---|---|
| 10,700,644 B1 | 6/2020 | Boujamaa |
| 10,726,897 B1 | 7/2020 | Maffitt et al. |
| 10,930,332 B2 | 2/2021 | Karmakar et al. |
| 11,227,640 B2 | 1/2022 | Shih et al. |
| 12,094,509 B2 * | 9/2024 | Kim .................... G11C 11/1677 |
| 2020/0350010 A1 | 11/2020 | Chou |
| 2021/0012821 A1 * | 1/2021 | Ramanan ............ G11C 11/1697 |
| 2021/0350836 A1 | 11/2021 | Shih et al. |
| 2022/0093142 A1 | 3/2022 | Shih et al. |

* cited by examiner

FIG. 14

| MC | Initial Read Voltage | Rref | Risk | Trimmed Read Voltage |
|---|---|---|---|---|
| ① | High (V5) | High | Read Disturb | Low (V1) |
| ② | Low (V1) | Low | Read Failure | High (V5) |
| ③ | High (V4) | Low | - | Non-trim (V4) |
| ④ | Low (V2) | High | - | Non-trim (V2) |
| ⑤ | Moderate (V3) | Moderate | - | Non-trim (V3) |

MEMORY DEVICE CONFIGURED TO GENERATE READ CURRENT BASED ON SIZE OF MEMORY CELL AND VALUE OF READ CURRENT ACTUALLY APPLIED TO MEMORY CELL

CROSS-REFERENCE TO RELATED APPLICATIONS

This application claims priority under 35 U.S.C. § 119 to Korean Patent Application No. 10-2022-0102952 filed on Aug. 17, 2022, in the Korean Intellectual Property Office, the disclosures of which are incorporated by reference herein in their entireties.

BACKGROUND

Some example embodiments of the present disclosure described herein relate to semiconductor devices, and more particularly, relate to memory devices including a magnetic tunnel junction element and/or test methods for determining a value of an optimal read voltage of the memory device.

Nowadays, various types of electronic devices are being used. As a high-speed and low-power electronic device is required, the electronic device may require a memory device satisfying high reliability, high speed, and low power consumption. To satisfy the requirements, a magnetic memory element has been suggested as a memory element of the memory device. Because the magnetic memory element operates at a high speed and is nonvolatile, the magnetic memory element is on the spotlight as a next-generation semiconductor memory element.

In general, the magnetic memory element may include a magnetic tunnel junction (MTJ) element. The MTJ element may include two magnetic materials and an insulating layer interposed therebetween. A resistance value of the MTJ element may vary depending on magnetization directions of the two magnetic materials. For example, the MJT element may have a great resistance value when the magnetization directions of the two magnetic materials are anti-parallel to each other and may have a small resistance value when the magnetization directions of the two magnetic materials are parallel to each other. Data may be written or read by using a difference between the resistance values.

Meanwhile, with regard to the reliability of the magnetic memory element, an issue such as read disturbance according to spin torque of the magnetic memory element may occur in performing a read operation of the memory device by using a current (or voltage) of an excessive magnitude, and an issue such as read fail may occur in performing a read operation of the memory device by using a current (or voltage) of an insufficient magnitude. In particular, because a value of a read current (or voltage) is stored in the memory device by a memory vendor in a test process, if once determined, the value of the read current (or voltage) may have a large influence on the performance of the memory device.

SUMMARY

Some example embodiments of the present disclosure provide devices and/or methods capable of determining a value of an optimal (or alternatively, desired) reference resistor through the minimum number of times (or alternatively, relatively a small number of times) of a program operation and determining a value of an optimal (or alternatively, desired) read current based on the value of the reference resistor thus determined.

According to an example embodiment, a memory device may include a memory cell array that includes a plurality of memory cells and divided into a first region and a second region, and a sensing circuit configured to generate a first read current for determining data stored in memory cells belonging to the first region from among the plurality of memory cells, wherein the second region is configured to store a value of the first read current determined based on a value of a reference resistance for distinguishing a parallel state and an anti-parallel state of a memory cell where the data is stored and a value of an initial read current applied to the memory cell.

According to an example embodiment, a method of operating a memory device which includes a plurality of memory cells includes programming at least one memory cell among the plurality of memory cells to a first state, first-counting fail bits of the at least one memory cell programmed to the first state by using a plurality of resistances having different values, for each reference resistance, programming the at least one memory cell to a second state, second-counting fail bits of the at least one memory cell programmed to the second state by using the plurality of resistances, for each reference resistance, selecting a value of a reference resistance among the plurality of resistances, based on a first counting result associated with the first state and a second counting result associated with the second state, and determining a value of a read voltage for the at least one memory cell, based on the selected value of the reference resistance and a value of an initial read current applied to at least one of magnetic tunnel junction elements.

According to an example embodiment, a memory device may include a memory cell array including a first region configured to store data and a second region configured to store a current value, a column decoder configured to select a bit line connected with a memory cell selected from memory cells of the first region, a row decoder configured to drive a word line connected with the selected memory cell, and a sensing circuit configured to generate a first read current based on the current value to determine data stored in a memory cell of the first region, wherein the current value is determined based on a value of a reference resistance for distinguishing a parallel state and an anti-parallel state of the memory cell where the data is stored and a value of an initial read current applied to the memory cell, and wherein the value of the reference resistance is determined based on a first result of counting a number of fail bits of the first region programmed to the parallel state for each resistance value and a second result of counting a number of fail bits of the first region programmed to the anti-parallel state for each resistance value.

BRIEF DESCRIPTION OF THE FIGURES

The above and other objects and features of the present disclosure will become apparent by describing in detail some example embodiments thereof with reference to the accompanying drawings.

FIG. 14 is a table illustrating a value of the optimal read voltage determined according to the example embodiment of FIG. 13.

DETAILED DESCRIPTION

Below, some example embodiments of the present disclosure will be described in detail and clearly to such an extent that an ordinary one in the art easily implements the inventive concepts.

In the detailed description, components described with reference to the terms "unit", "module", "block", "~er or ~or", etc. and function blocks illustrated in drawings will be implemented with software, hardware, or a combination thereof. For example, the software may be a machine code, firmware, an embedded code, and application software. For example, the hardware may include an electrical circuit, an electronic circuit, a processor, a computer, an integrated circuit, integrated circuit cores, a pressure sensor, an inertial sensor, a microelectromechanical system (MEMS), a passive element, or a combination thereof.

Figure 1:
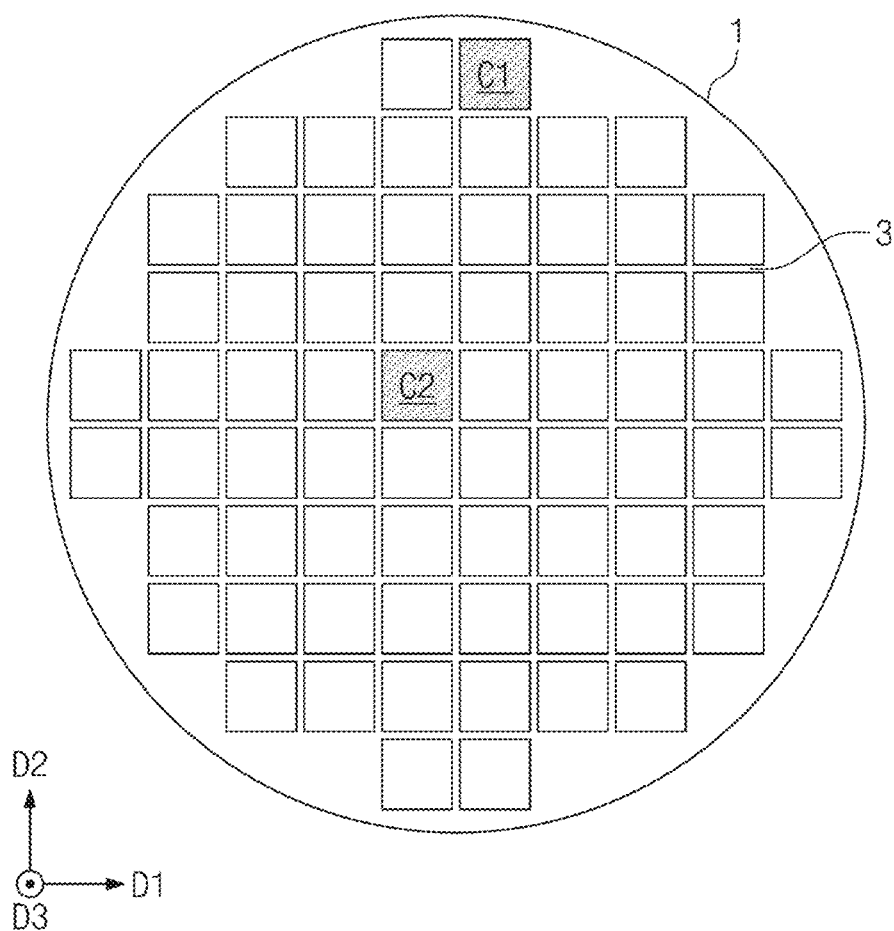
FIG. 1 is a diagram illustrating a substrate where memory chips according to an example embodiment of the present disclosure are integrated.

FIG. 1 is a diagram illustrating a substrate 1 where memory chips according to an example embodiment of the present disclosure are integrated. The substrate 1 may include a plurality of memory chips including a first memory chip C1 and a second memory chip C2, and a scribe line region 3 between memory chips. The memory chips may be two-dimensionally arranged in a first direction D1 and a second direction D2. Each chip may be surrounded by the scribe line region 3. That is, the scribe line region 3 may be defined between memory chips adjacent in the first direction D1 and between memory chips adjacent in the second direction D2.

In an example embodiment, the substrate 1 may be a semiconductor substrate such as a semiconductor wafer. The substrate 1 may be a bulk silicon substrate, a silicon on insulator (SOI) substrate, a germanium substrate, a germanium on insulator (GOI) substrate, a silicon-germanium substrate, or a substrate of an epitaxial thin film formed through selective epitaxial growth (SEG). For example, the substrate 1 may include at least one of silicon (Si), germanium (Ge), silicon germanium (SiGe), gallium arsenic (GaAs), Indium Gallium Arsenide (InGaAs), aluminum gallium arsenide (AlGaAs), or a mixture thereof. The substrate 1 may have a single crystalline structure.

For example, the first memory chip C1 may represent a memory chip formed at a periphery of the substrate 1 and the second memory chip C2 may represents a memory chip formed on the center of the substrate 1.

Meanwhile, a program characteristic and a reference resistance characteristic of memory cells constituting a memory chip may vary depending on a location on the substrate 1, at which the memory chip is formed. For example, in the case where memory chips formed on the substrate 1 include MRAM cells, the size of the MRAM cell may vary depending on a location of a memory chip in the substrate 1.

For example, due to a manufacturing process, the size of the MRAM cell of the first memory chip C1 placed on an outer portion of the substrate 1 may be relatively small, and the size of the MRAM cell of the second memory chip C2 placed on an inner portion of the substrate 1 may be relatively large due to the manufacturing process. Due to another manufacturing process, the size of the MRAM cell of the first memory chip C1 may be relatively large, and the size of the MRAM cell of the second memory chip C2 may be relatively small. According to an example embodiment of the present disclosure, a value of an optimal read current for the corresponding chip is determined in consideration of a relative size of the MRAM cell. Accordingly, the read disturbance for the memory chip may be mitigated or prevented, and reliability of the memory chip may be improved. This will be described in detail below.

Figure 2:
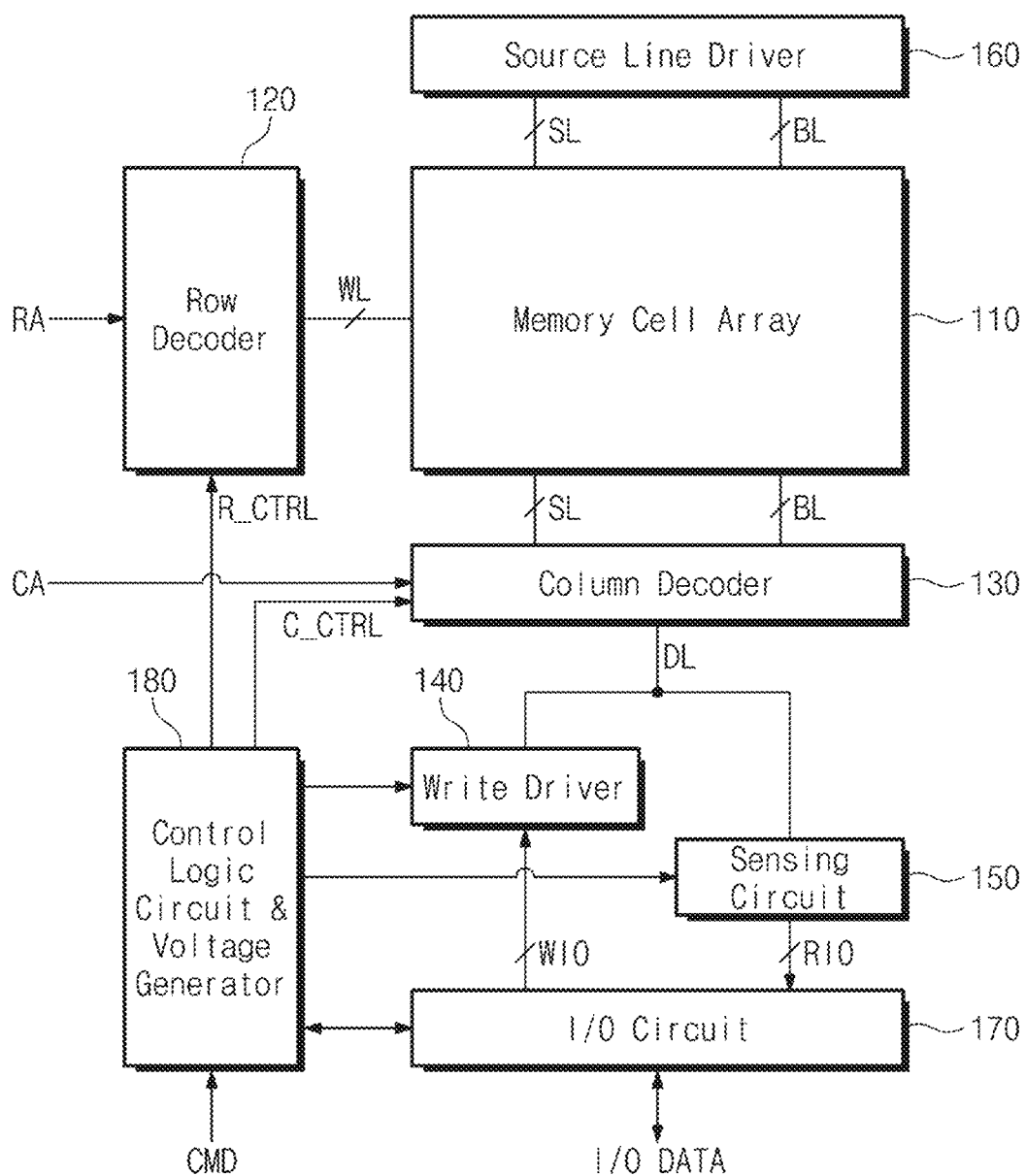
FIG. 2 is a diagram illustrating a configuration of a memory device including memory chips of FIG. 1.

FIG. 2 is a diagram illustrating a configuration of a memory device including the memory chips C1 and C2 of FIG. 1. A memory device 100 may include a memory cell array 110, a row decoder 120, a column decoder 130, a write driver 140, a sensing circuit 150, a source line driver 160, an input/output circuit 170, and a control logic circuit and voltage generator 180. In an example embodiment, each of the memory chips C1 and C2 of FIG. 1 may include the memory cell array 110. However, the present disclosure is not limited thereto. For example, each of the memory chips C1 and C2 may further include one or more of the remaining components of the memory device 100, in addition to the memory cell array 110.

The memory cell array 110 may include a plurality of memory cells each configured to store data. For example, each memory cell may include a variable resistance element, and a value of data stored therein may be determined based on a resistance value of the variable resistance element. For example, each memory cell may include an MRAM (Magneto-resistive RAM) cell, an STT-MRAM (Spin Transfer Torque MRAM) cell, an SOT-MRAM (Spin-Orbit Torque MRAM) cell, a PRAM (Phase-change RAM) cell, an ReRAM (Resistive RAM) cell, etc. In the specification, below, the description will be given under the assumption that each memory cell includes an STT-MRAM cell.

The memory cells constituting the memory cell array 110 may be connected with source lines SL, bit lines BL, and word lines WL. For example, memory cells arranged along a row may be connected in common with a word line corresponding to the row, and memory cells arranged along a column may be connected in common with a source line and a bit line corresponding to the column.

The row decoder 120 may select (or drive) the word line WL connected with a memory cell targeted for a read operation or a program operation, based on a row address RA and a row control signal R_CTRL. The row decoder 120 may provide the selected word line with a driving voltage received from the control logic circuit and voltage generator 180.

The column decoder 130 may select the bit line BL and/or the source line SL connected with the memory cell targeted for the read operation or the program operation, based on a column address CA and a column control signal C_CTRL.

In the program operation, the write driver 140 may drive a program voltage (or a write current) for storing write data in a memory cell selected by the row decoder 120 and the column decoder 130. For example, in the program operation of the memory device 100, the write driver 140 may store the write data in the selected memory cell by controlling a voltage of a data line DL based on the write data provided from the input/output circuit 170 through a write input/output line WIG.

Meanwhile, the data line DL is illustrated for convenience of description and brevity of drawing, but the data line DL may be understood as corresponding to the bit line BL and the source line SL selected by the column decoder 130.

In the read operation, the sensing circuit 150 may sense a signal output through the data line DL and may determine a value of data stored in the selected memory cell. The sensing circuit 150 may be connected with the column decoder 130 through the data line DL and may be connected with the input/output circuit 170 through a read input/output line RIO. The sensing circuit 150 may output the sensed read data to the input/output circuit 170 through the read input/output line RIO.

The source line driver 160 may drive the source line SL with a specific voltage level under control of the control logic circuit and voltage generator 180. For example, the source line driver 160 may be provided with a voltage for driving the source line SL from the control logic circuit and voltage generator 180. For example, a value of a voltage that is applied from the source line driver 160 to the source line SL may be variable in the case of performing the program operation such that a memory cell has a great resistance value (e.g., an anti-parallel state) or in the case of performing the program operation such that a memory cell has a small resistance value (e.g., a parallel state).

Meanwhile, although not illustrated in FIG. 2, the memory device 100 may further include an anti-fuse array. The anti-fuse array may include anti-fuses arranged along rows and columns. For example, an anti-fuse that is a one-time programmable (OTP) memory may be nonvolatile. Information about the memory device 100 may be programmed in the anti-fuse array. For example, information about a fail address of the memory cell array 110, information about internal voltages (e.g., a program voltage and a read voltage) of the memory device 100, etc. may be written in the anti-fuse array. According to an example embodiment of the present disclosure, information about a value of an optimal (or desired) program voltage determined in the process of testing a memory device may be programmed in the anti-fuse array.

Figure 3:
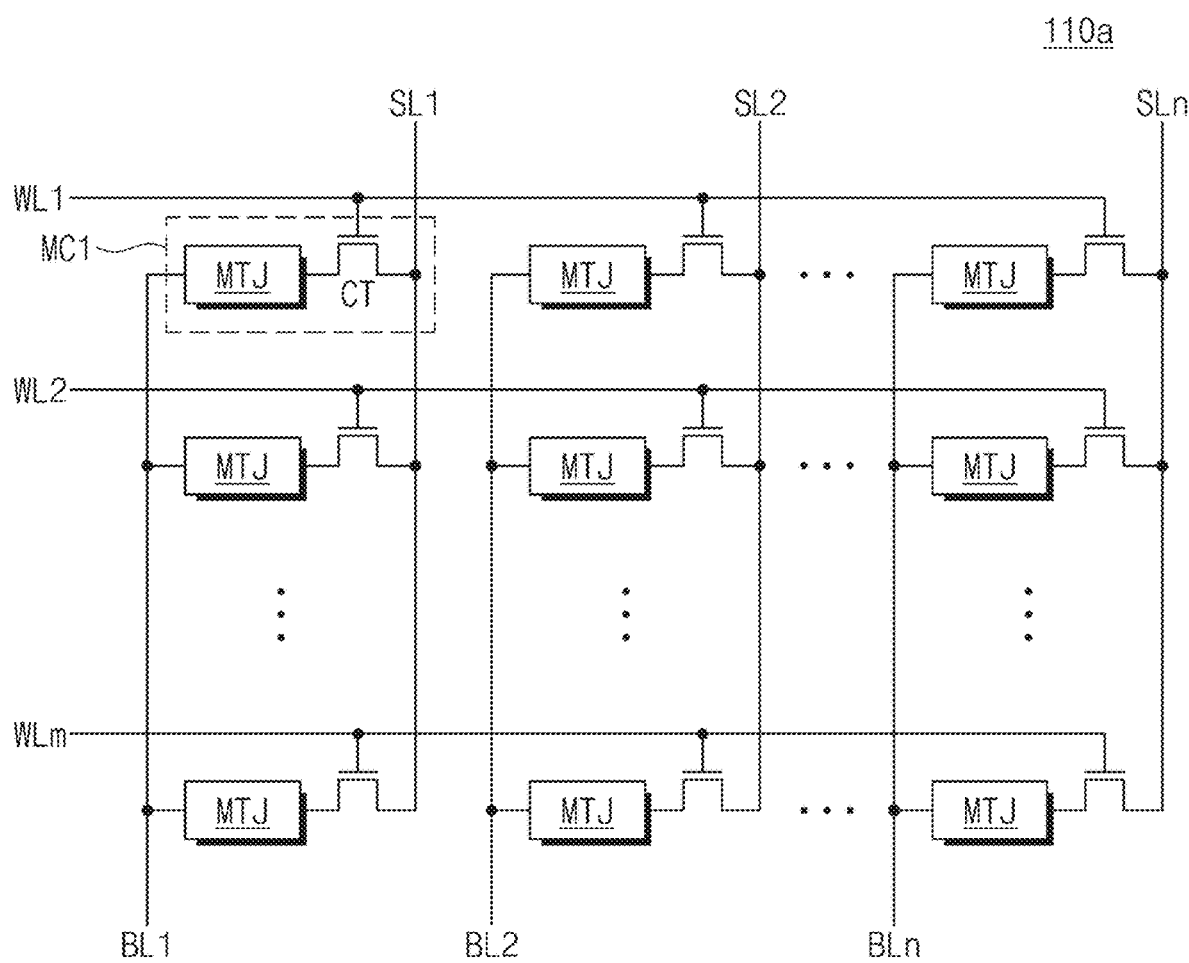
FIG. 3 is a circuit diagram illustrating a configuration of a memory cell array of FIG. 2.

FIG. 3 is a circuit diagram illustrating a configuration of the memory cell array 110 of FIG. 2. A memory cell array 110a may include a plurality of memory cells arranged along row and column directions. Each memory cell may include a magnetic tunnel junction (MTJ) element and a cell transistor CT. As the MTJ element of each memory cell is programmed to have a specific resistance value, data corresponding to the specific resistance value may be stored in each memory cell. In an example embodiment, a memory cell indicated by a dotted box from among the plurality of memory cells is marked by a first memory cell "MC1".

The plurality of memory cells may be connected with word lines WL1 to WLm, bit lines BL1 to BLn, and source lines SL1 to SLn. In the memory cell MC1, a first end of the MTJ element may be connected with the first bit line BL1, and a second end of the MTJ element may be connected with a first end of the cell transistor CT. A second end of the cell transistor CT may be connected with the first source line SL1, and a gate electrode of the cell transistor CT may be connected with the first word line WL1.

Figure 4:
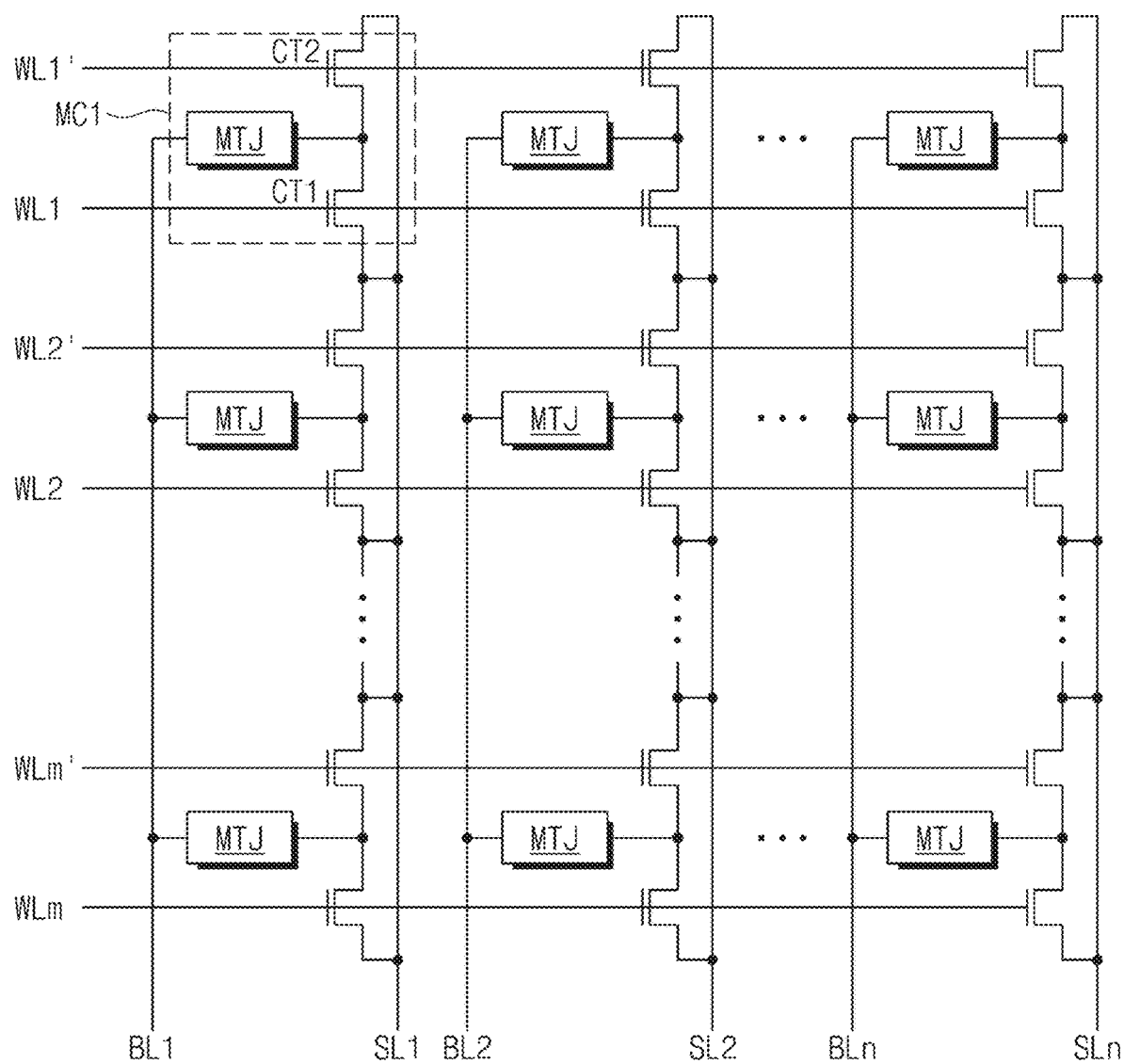
FIG. 4 is a circuit diagram illustrating a configuration of a memory cell array of FIG. 2.

FIG. 4 is a circuit diagram illustrating a configuration of the memory cell array 110 of FIG. 2. A memory cell array 110b may include a plurality of memory cells arranged along row and column directions. Each memory cell may include an MTJ element and two cell transistors. An example embodiment where the first memory cell MC1 indicated by a dotted box from among the plurality of memory cells includes an MTJ element, a first cell transistor CT1, and a second cell transistor CT2 is illustrated in FIG. 4.

The first memory cell MC1 may have a structure in which the two cell transistors CT1 and CT2 share one MTJ element. In the first memory cell MC1, a first end of the MTJ element may be connected with the first bit line BL1, and a second end of the MTJ element may be connected with first ends of the first and second cell transistors CT1 and CT2. Second ends of the cell transistors CT1 and CT2 may be connected to the first source line SL1. A gate electrode of the first cell transistor CT1 may be connected with the first word line WL1, and a gate electrode of the second cell transistor CT2 may be connected with a first sub-word line WL1'. Each of the cell transistors CT1 and CT2 may be switched on or switched off by a signal (or a voltage) provided through the first word line WL1 or the first sub-word line WL1'.

Figure 5:
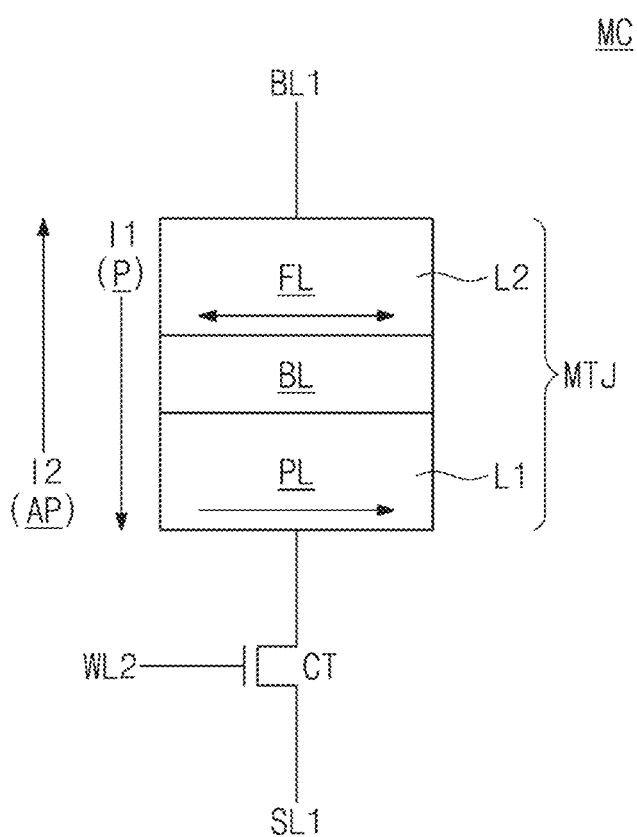
FIGS. 5 and 6 are diagrams illustrating a configuration of a memory cell of FIG. 3.
Figure 6:
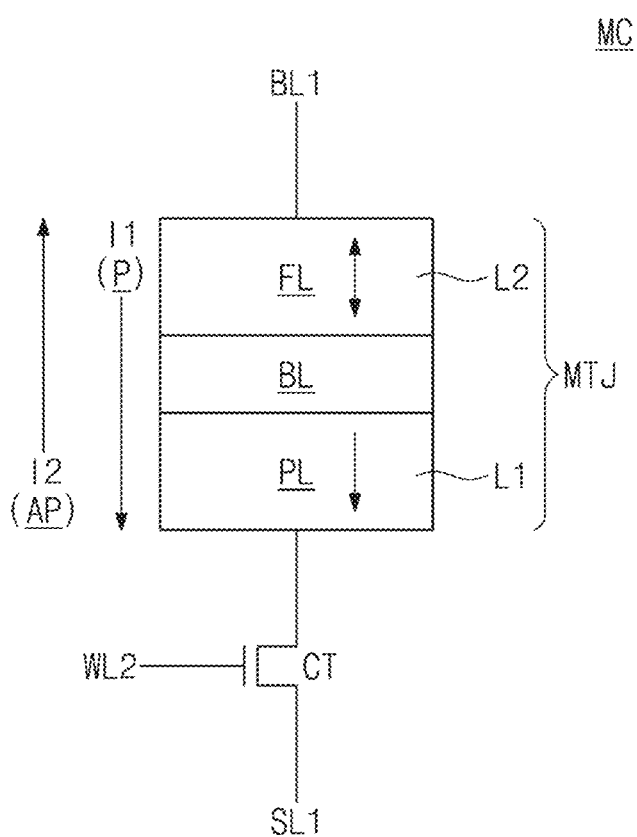

FIGS. 5 and 6 are diagrams illustrating a configuration of a memory cell of FIG. 3.

Referring to FIGS. 5 and 6, an MTJ element may include a first magnetic layer L1, a second magnetic layer L2, and a barrier layer BL (or a tunneling layer) interposed between the first magnetic layer L1 and the second magnetic layer L2. The barrier layer BL may include at least one of magnesium (Mg) oxide, titanium (terminal) oxide, aluminum (Al) oxide, magnesium-zinc (Mg—Zn) oxide, or magnesium-boron (Mg—B) oxide, or a combination thereof.

Each of the first magnetic layer L1 and the second magnetic layer L2 may include at least one magnetic layer.

For example, the first magnetic layer L1 may include a reference layer (e.g., a pinned layer PL) having a magnetization direction fixed (or pinned) in a specific direction, and the second magnetic layer L2 may include a free layer FL having a magnetization direction that is changeable to be parallel or anti-parallel to the magnetization direction of the reference layer. However, FIGS. 5 and 6 shows, by means of example, the case where the first magnetic layer L1 includes the reference layer PL and the second magnetic layer L2 includes the free layer FL, but the present disclosure is not limited thereto. For example, unlike the example embodiments illustrated in FIGS. 5 and 6, the first magnetic layer L1 may include a free layer, and the second magnetic layer L2 may include a pinned layer.

In an example embodiment, as illustrated in FIG. 5, magnetization directions may be substantially parallel to an interface of the barrier layer BL and the first magnetic layer L1. In this case, each of the reference layer PL and the free layer FL may include a ferromagnetic material. For example, the reference layer PL may further include an anti-ferromagnetic material for pinning a magnetization direction of the ferromagnetic material.

In an example embodiment, as illustrated in FIG. 6, magnetization directions may be substantially perpendicular to an interface of the barrier layer BL and the first magnetic layer L1. In this case, each of the reference layer PL and the free layer FL may include at least one of perpendicular magnetic materials (e.g., CoFeTb, CoFeGd, or CoFeDy), perpendicular magnetic materials with an L10 structure, CoPt-based materials with a hexagonal-close-packed-lattice structure, and perpendicular magnetic structures, or a combination thereof. The perpendicular magnetic material with the L10 structure may include at least one of FePt with the L10 structure, FePd with the L10 structure, CoPd with the L10 structure, or CoPt with the L10 structure, or a combination thereof. The perpendicular magnetic structure may include magnetic layers and non-magnetic layers that are alternately and repeatedly stacked. For example, the perpendicular magnetic structure may include at least one of (Co/Pt)n, (CoFe/Pt)n, (CoFe/Pd)n, (Co/Pd)n, (Co/Ni)n, (CoNi/Pt)n, (CoCr/Pt)n, or (CoCr/Pd)n, in which "n" is the number of stacked layers, or a combination thereof. Here, a thickness of the reference layer PL may be greater than a thickness of the free layer FL, or a coercive force of the reference layer PL may be greater than a coercive force of the free layer FL.

In an example embodiment, when a relatively high level of a voltage is applied to the bit line BL1 and a relatively low level of a voltage is applied to the source line SL1, a write current I1 may flow. In this case, a magnetization direction of the second magnetic layer L2 may be identical to a magnetization direction of the first magnetic layer L1, and the MTJ element may have a low resistance value (e.g., a parallel state).

In contrast, when a relatively high level of a voltage is applied to the source line SL1 and a relatively low level of a voltage is applied to the bit line BL1, a write current I2 may flow. In this case, a magnetization direction of the second magnetic layer L2 may be opposite to a magnetization direction of the first magnetic layer L1, and the MTJ element may have a great resistance value (e.g., an anti-parallel state).

In an example embodiment, in the case where the MTJ element is in the parallel state, the memory cell MC may be regarded as storing data of a first value (e.g., logic "0"). In contrast, in the case where the MTJ element is in the anti-parallel state, the memory cell MC may be regarded as storing data of a second value (e.g., logic "1").

Meanwhile, only one cell transistor CT is illustrated in FIGS. 5 and 6, but the components illustrated in FIGS. 5 and 6 may also be applied to the memory cell of FIG. 4. In this case, the cell transistors CT1 and CT2 may be connected with one end of the MTJ element. A basic principle, an operation, and the like of the MTJ element may be identically applied to the memory cell of FIG. 4 except that a current path changes depending on a cell transistor turned on from among the cell transistors CT1 and CT2.

Figure 7:
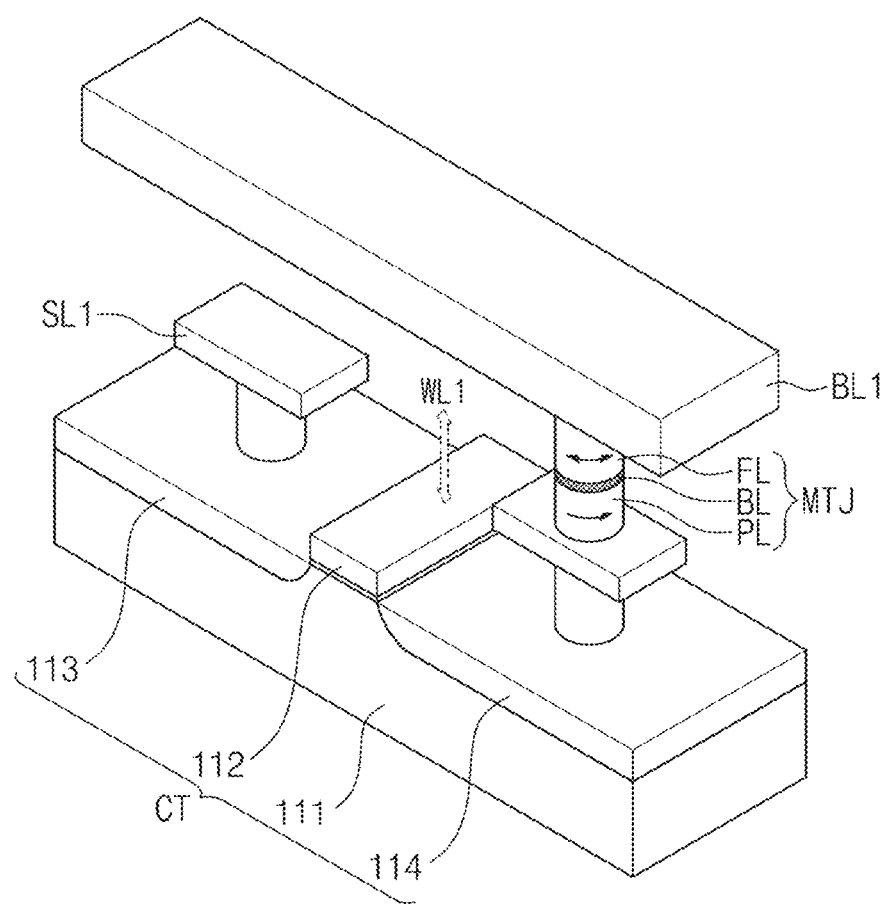
FIG. 7 is a conceptual diagram illustrating a configuration associated with a memory cell of FIG. 4.

FIG. 7 is a conceptual diagram illustrating a configuration associated with a memory cell of FIG. 4.

The cell transistor CT may include a body substrate 111, a gate electrode 112, and junctions 113 and 114. The junction 113 may be formed on the body substrate 111 and may be connected with the source line SL1. The junction 114 may be formed on the body substrate 111 and may be connected with the bit line BL1 through the MTJ element. The gate electrode 112 may be formed on the body substrate 111 between the junctions 113 and 114 and may be connected with the word line WL1. Meanwhile, the configuration of FIG. 7 is provided as an example. Like the example embodiment described with reference to FIG. 4, in the case where two cell transistors share one MTJ element, a modified version of the configuration illustrated in FIG. 4 may be adopted.

Figure 8:
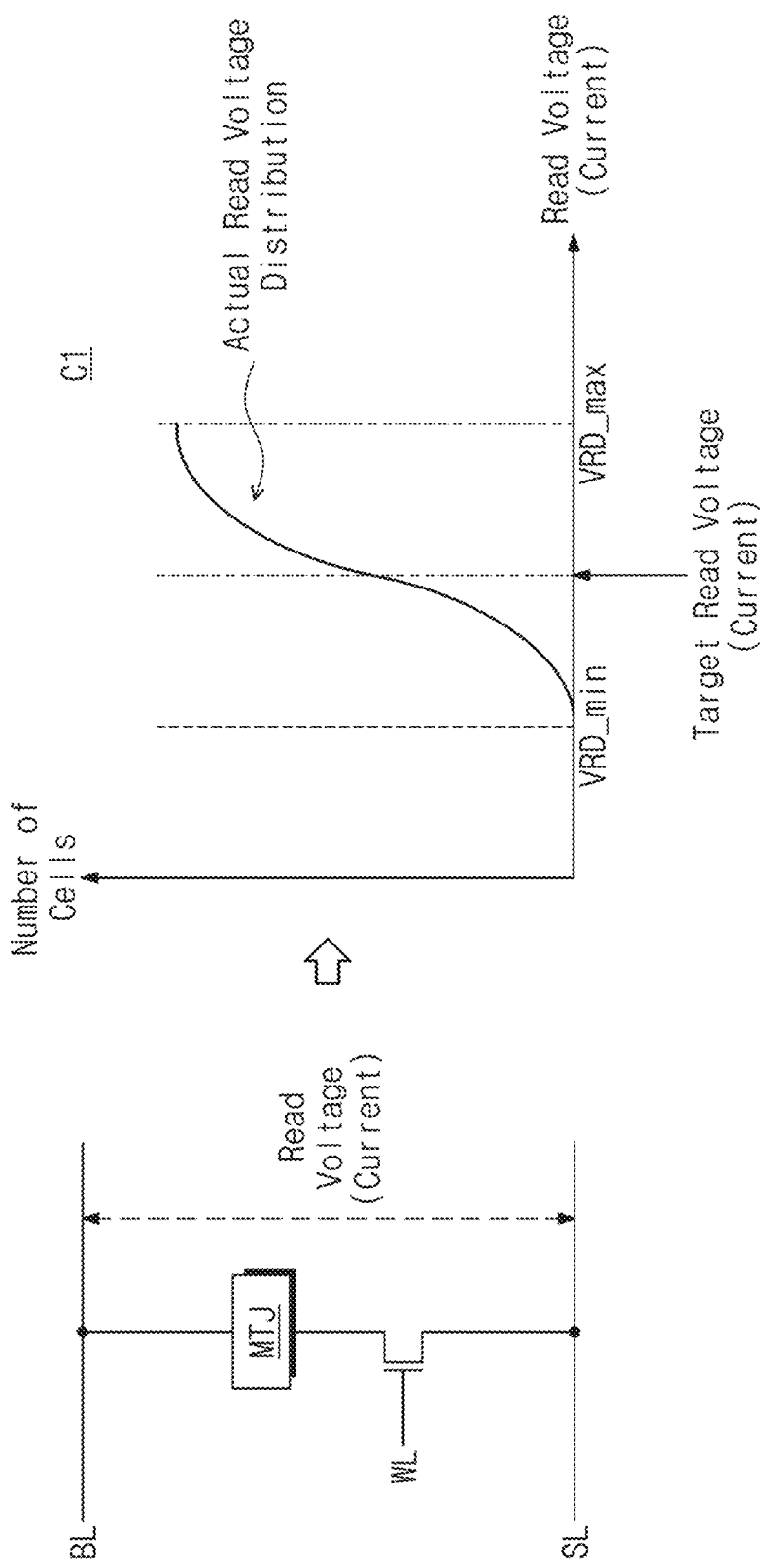
FIG. 8 is a diagram illustrating a distribution of a read voltage for an MTJ element.

FIG. 8 is a diagram illustrating a distribution of a read voltage for an MTJ element. In an example embodiment, it is assumed that a voltage distribution of FIG. 8 corresponds to a read voltage distribution of MTJ elements of the first memory chip C1 (refer to FIG. 1). Referring to FIG. 8, a read voltage that is a voltage for reading the MTJ element may be a voltage applied between the bit line BL and the source line SL. In general, a memory device may be manufactured such that a read voltage (e.g., a target voltage) intended by a memory vendor is output through the bit line BL or the source line SL (or is applied across the MTJ element).

However, due to various causes such as a manufacturing process and a device characteristic, a value of an actual read voltage applied to the MTJ element (e.g., a value of an initial read voltage) is different from a value of the target read voltage. In an example embodiment, the tendency of the read voltage actually applied to MTJ elements of the first memory chip C1 may follow a graph illustrated in FIG. 8. For example, the number of MTJ elements, across which the read voltage similar in magnitude to the target read voltage is applied, from among the MTJ elements of the memory chip may be great. The number of MTJ elements, across which the read voltage having a great difference with the target read voltage is applied, from among the MTJ elements of the memory chip may be small.

Accordingly, when the memory chip C1 is tested to obtain a value of an optimal read voltage, the value of the optimal read voltage may be obtained by testing at least one (e.g., a test MTJ element) of the MTJ elements of the first memory chip C1. For example, when the value of the read voltage actually applied to the test MTJ element is greater than the value of the target read voltage, the first memory chip C1 may be manufactured such that the read voltage smaller in value than the target read voltage is applied. In contrast, when the value of the read voltage actually applied to the test MTJ element is smaller than the value of the target read voltage, a memory device may be manufactured such that the read voltage greater in value than the target read voltage is applied.

However, the memory device of the present disclosure does not determine a value of the optimal read voltage only in consideration of a value of a read voltage actually applied to an MTJ element. For example, the value of the optimal read voltage of the first memory chip C1 is determined in consideration of the size of the MTJ element (or a value of an optimal reference resistance) together with the value of the read voltage. How to determine the value of the read voltage in consideration of the size of the MTJ element (or the value of the optimal reference resistance) will be described with reference to FIGS. 9 to 11.

Figure 9:
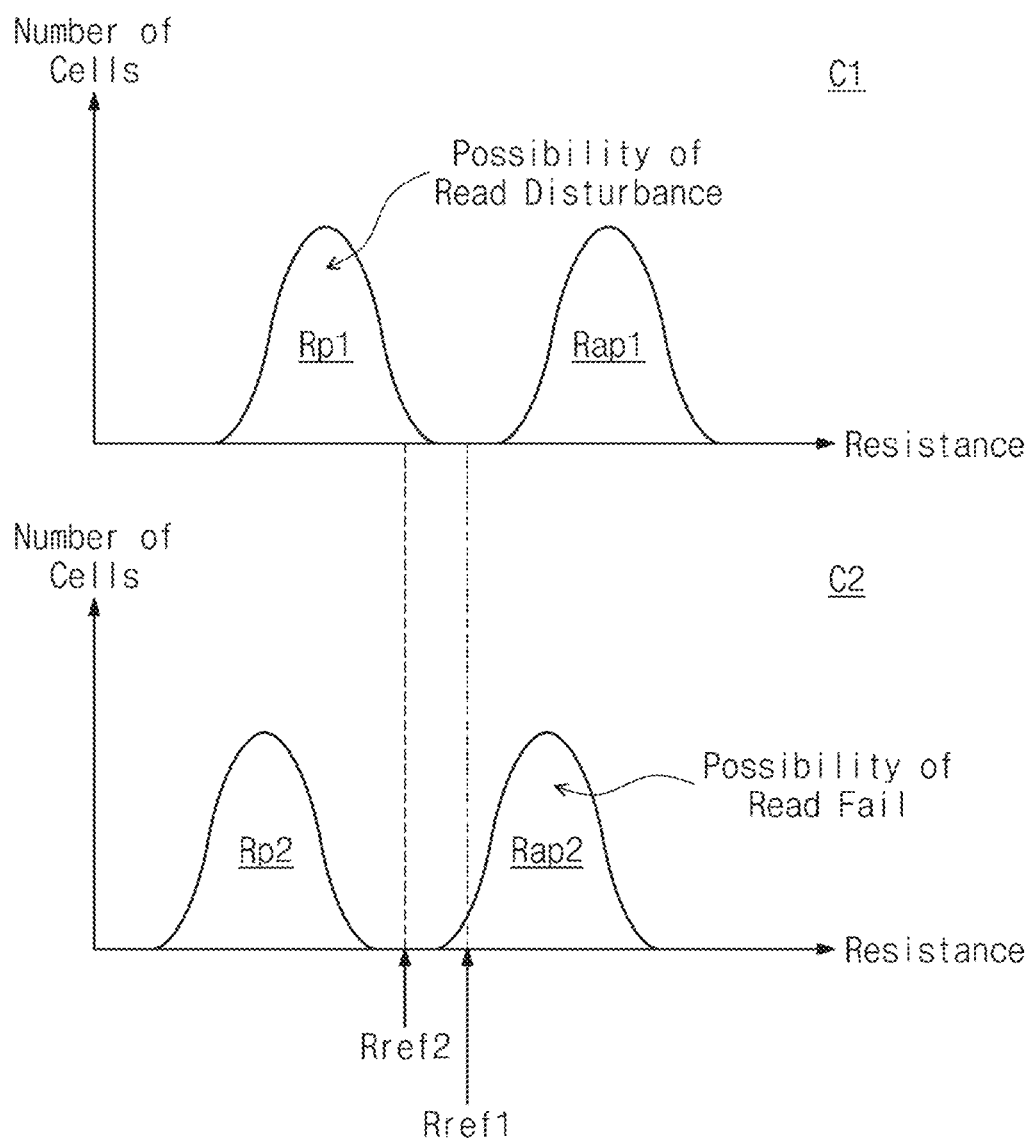
FIG. 9 is a diagram illustrating a graph associated with a program state of a memory cell of FIG. 5 or 6.

FIG. 9 is a diagram illustrating a graph associated with a program state of a memory cell of FIG. 5 or 6.

Like the brief description given with reference to FIG. 1, the read characteristics of the memory chips C1 and C2 manufactured from the same substrate 1 may vary due to various process issues. For example, a resistance distribution diagram corresponding to the first memory chip C1 may be different from a resistance distribution diagram corresponding to the second memory chip C2. For example, when the size of the MRAM cell in the first memory chip C1 is smaller than the size of the MRAM cell in the second memory chip C2, a resistance value of the MRAM cell in the first memory chip C1 may be substantially greater than a resistance value of the MRAM cell in the second memory chip C2. A value of a read voltage (or current) to perform the read operation on the MRAM cell in the first memory chip C1 may be substantially smaller than a value of a read voltage (or current) to perform the read operation on the MRAM cell in the second memory chip C2. However, in another example embodiment, when the size of the MRAM cell in the first memory chip C1 is larger than the size of the MRAM cell in the second memory chip C2, the resistance characteristic and the read voltage characteristic may be opposite to those described above.

First, referring to the graph corresponding to the first memory chip C1, in the read operation, a resistance distribution Rp1 of memory cells programmed to the parallel state and a resistance distribution Rap1 of memory cells programmed to the anti-parallel state may be distinguished by a read voltage corresponding to a first reference resistance Rref1. Referring to the graph corresponding to the second memory chip C2, in the read operation, a resistance distribution Rp2 of memory cells programmed to the parallel state and a resistance distribution Rap2 of memory cells programmed to the anti-parallel state may be distinguished by a read voltage corresponding to a second reference resistance Rref2.

However, a magnitude of the read voltage corresponding to the first reference resistance Rref1 may be somewhat small to determine a program state of memory cells in the second memory chip C2. The reason is that a relatively great read voltage is desired to determine the program state of the memory cells in the second memory chip C2 in which the cell size is relatively large. That is, the read failure may occur when the read operation is performed on the memory cells in the second memory chip C2 by using the voltage of the relatively small value corresponding to the first reference resistance Rref1.

In contrast, a magnitude of the read voltage corresponding to the second reference resistance Rref2 may be somewhat great to determine a program state of memory cells in the first memory chip C1. The reason is that a relatively small value of read voltage is desired to determine the program state of the memory cells in the first memory chip C1 in which the cell size is relatively small. That is, when the read operation is performed on the first memory chip C1 by using the relatively great value of the read voltage corresponding to the second reference resistance Rref2, the read disturbance may occur due to a switch of a spin state.

Thus, an unintended issue may occur when the read operation is performed on the memory chips C1 and C2 manufactured from one wafer 1 (refer to FIG. 1) by using the same read voltage.

Figure 10:
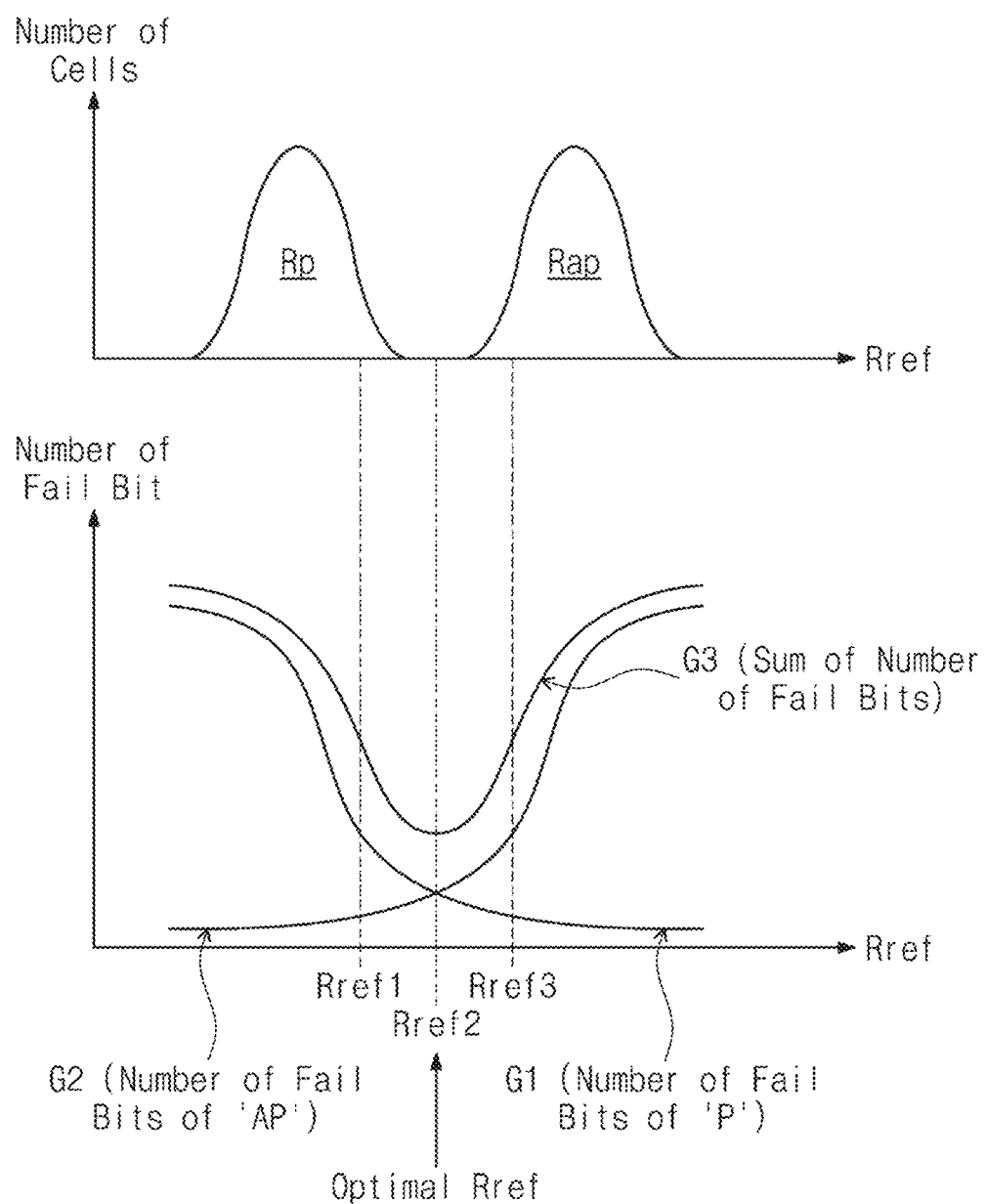
FIG. 10 is a diagram conceptually illustrating how to determine a value of an optimal reference resistance corresponding to a value of an optimal program voltage of a memory device, according to an example embodiment of the present disclosure.

FIG. 10 is a diagram conceptually illustrating how to determine a value of an optimal (or alternatively, desired) reference resistance corresponding to a value of an optimal (or alternatively, desired) program voltage of a memory device, according to an example embodiment of the present disclosure.

Referring to FIG. 10, in a test operation of a memory device, a pre-program operation of the memory device may be performed. Herein, the pre-program operation may mean a program operation for searching for a value of an optimal reference resistance for distinguishing the parallel state and the anti-parallel state in the process of testing a memory device, not for storing data. For example, a program voltage that is applied to the memory device in the pre-program operation may be higher in level than a program voltage that is used in a normal program operation after the product shipping. This may be associated with mitigating or preventing a program failure to accurately perform the test operation.

First, memory cells of the memory device may be programmed to the parallel state by using a test device (e.g., automatic test equipment (ATE)). In FIG. 10, "Rp" indicates a distribution of resistance values of memory cells programmed to the parallel state. Afterwards, the number of fail bits of the memory device may be counted by using the test device. For example, in the case where the write operation is performed by using a write voltage corresponding to a relatively small value of a reference resistance (e.g., the first reference resistance Rref1), the number of fail bits may be very great. As a value of the reference resistance becomes greater (or as a value of the write voltage becomes smaller), the number of fail bits of the memory device may decrease. A graph indicated by "G1" shows the tendency of the number of counted fail bits.

The memory cells of the memory device may be programmed to the anti-parallel state by using the test device. In FIG. 10, "Rap" indicates a distribution of resistance values of memory cells programmed to the anti-parallel state. Afterwards, the number of fail bits of the memory device may be counted by using the test device. For example, in the case where the write operation is performed by using a write voltage corresponding to a relatively small value of a reference resistance (e.g., the first reference resistance Rref1), the number of fail bits may be very small. However, as a value of the reference resistance becomes greater (or as a value of the write voltage becomes smaller), the number of fail bits of the memory device may increase. A graph indicated by "G2" shows the tendency of the number of counted fail bits.

Afterwards, the test device may determine a value of an optimal reference resistance by using the number of counted fail bits. For example, the test device may sum the graph G1 indicating the number of fail bits measured in the parallel state and the graph G2 indicating the number of fail bits measured in the anti-parallel state. A graph indicated by "G3" may be drawn as a sum result. In the graph indicated by "G3", a resistance value (e.g., Rref2) corresponding to the smallest number of fail bits may be a value of the optimal reference resistance of the memory device.

Afterwards, the test device may decide a value of the optimal read voltage for the memory device, based on the value of the optimal reference resistance (e.g., Rref2). A value of the read voltage may be drawn from the size of the MRAM cell measured in advance, the reference resistance value according to the size of the MRAM cell, and the tendency of the value of the program voltage according to the reference resistance value.

In an example embodiment, the case where the optimal reference resistance value is relatively small (e.g., Rref1) may mean that the size of the MRAM cell of the memory device is relatively large, which may mean that a relatively great value of a write voltage is desired. In contrast, the case where the optimal reference resistance value is relatively great (e.g., Rref3) may mean that the size of the MRAM cell of the memory device is relatively small, which may mean that a relatively small value of a write voltage is desired.

Assuming that the above conditions are applied to the first memory chip C1 and the second memory chip C2, there may be drawn that an optimal reference resistance value of the first memory chip C1 is relatively great (e.g., Rref3) and thus a relatively small value of a read voltage is desired in the read operation of the first memory chip C1. As in the above description, there may be drawn that an optimal reference resistance value of the second memory chip C2 is relatively small (e.g., Rref1) and thus a relatively great value of a read voltage is desired in the read operation of the second memory chip C2.

Figure 11:
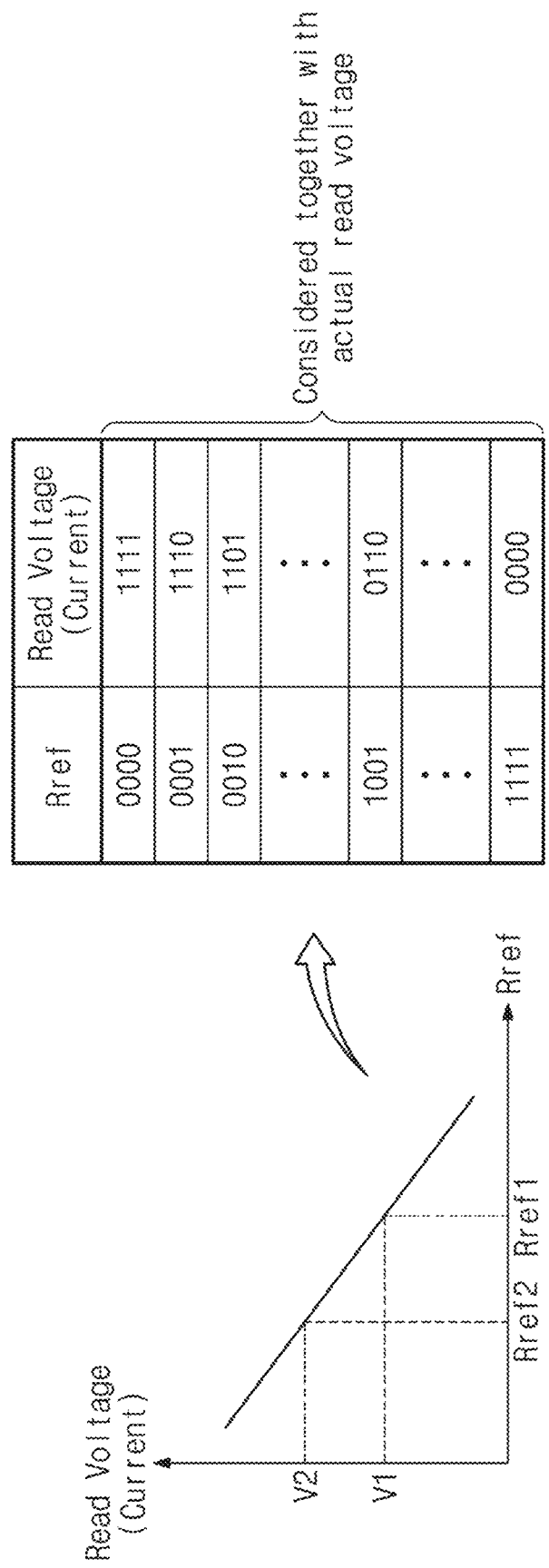
FIG. 11 is a diagram conceptually illustrating a relationship between a value of a reference resistance determined in a test operation for a memory device and a value of a write voltage corresponding thereto.

FIG. 11 is a diagram conceptually illustrating a relationship between a value of a reference resistance determined in a test operation for a memory device and a value of a write voltage corresponding thereto.

In an example embodiment, a value of a reference resistance of a memory device may be inversely proportional to a value of a read voltage (or current) of the memory device, which corresponds to the reference resistance value. However, the reference resistance value of the memory device may not be accurately inversely proportional to a value of the optimal read voltage corresponding thereto. It should be understood that a value of a read voltage decreases as a value of a reference resistance increases.

A graph of FIG. 11 shows that a relatively great value of the first reference resistance Rref1 corresponds to an MRAM cell having a relatively small size and a value of a read voltage corresponding thereto is "V1" being relatively small. In contrast, the graph of FIG. 11 shows that a relatively small value of the second reference resistance Rref2 of a relatively small value corresponds to an MRAM cell having a relatively large size and a value of a read voltage corresponding thereto is "V2" being relatively great.

In an example embodiment, each of a value of a reference resistance and a value of a read voltage (or current) may be expressed by 4 bits, but the present disclosure is not limited thereto. In the case where the reference resistance value is expressed by 4 bits, the fail bit counting operation described with reference to FIG. 10 may be performed as much as 16 times or less for each fail bit counting operation for the parallel state and for each fail bit counting operation for the anti-parallel state. For example, a read voltage (or current) may be variable between a first value corresponding to "1111" and a second value corresponding to "0000".

A table indicating a relationship between a reference resistance value (e.g., "1001") and a read voltage value (e.g., "0110") of a memory device may be used to determine a value of the optimal read voltage together with the read voltage distribution described with reference to FIG. 9, in the process of testing the memory device.

Figure 12:
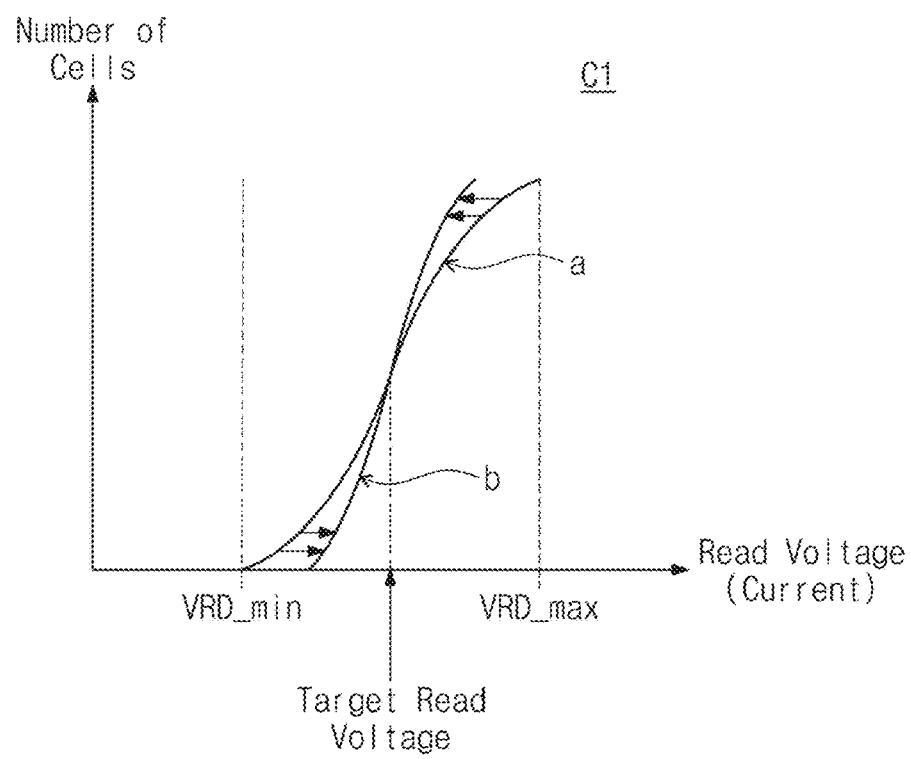
FIG. 12 is a graph conceptually illustrating how to determine a value of the optimal read voltage only in consideration of a write voltage distribution of MTJ elements.
Figure 13:
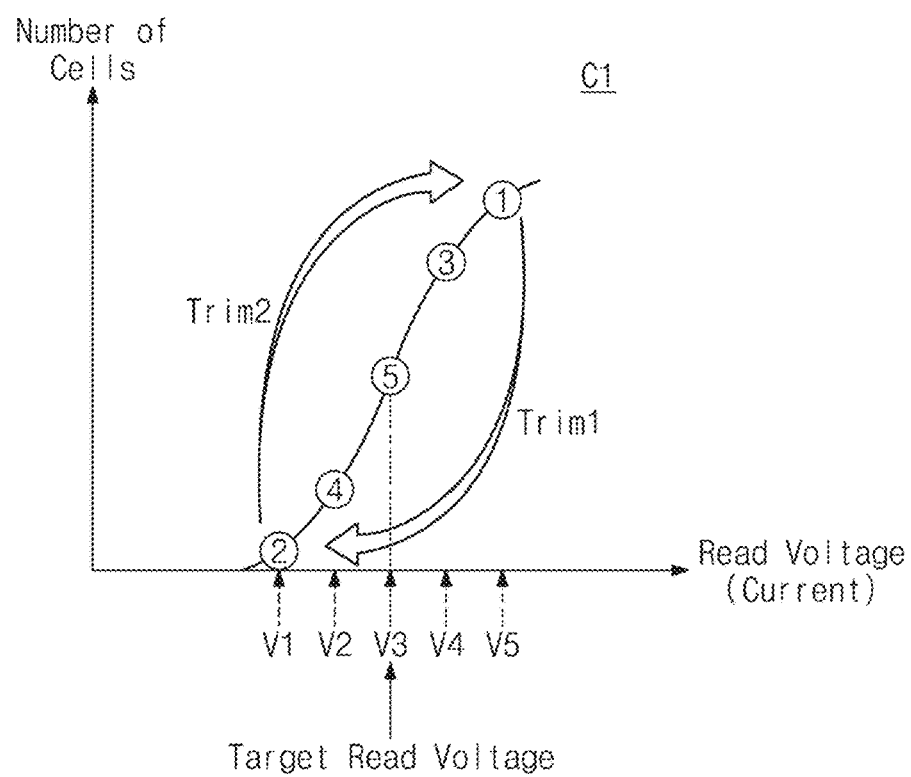
FIG. 13 is a graph conceptually illustrating how to determine a value of the optimal read voltage in consideration of both a read voltage distribution of MTJ elements and a size of a MTJ element.

FIG. 12 is a graph conceptually illustrating how to determine a value of the optimal read voltage only in consideration of a write voltage distribution of MTJ elements. FIG. 13 is a graph conceptually illustrating how to determine a value of the optimal read voltage in consideration of both a read voltage distribution of MTJ elements and a size of a MTJ element.

FIG. 14 is a table illustrating a value of the optimal read voltage determined according to the example embodiment of FIG. 13.

First, referring to FIG. 12, a graph indicated by "a" is an initial read voltage distribution, and a graph indicated by "b" is a trimmed read voltage distribution. For example, in the case where a write voltage actually applied to an MTJ element is greater than an intended value (e.g., VRD_max), a memory device may be manufactured such that the read voltage being smaller in value than a target read voltage is actually applied to the MTJ element. As in the above description, in the case where the read voltage actually applied to the MTJ element is smaller than an intended value (e.g., VRD_min), a memory device may be fabricated such that the read voltage being greater in value than the target read voltage is actually applied to the MTJ element. In conclusion, through the above trimming process, a write voltage distribution indicated by "a" may be shifted to a write voltage distribution indicated by "b".

However, in the case of determining a value of the optimal read voltage only in consideration of a value of a read voltage actually applied to an MTJ element, the unintended write failure or endurance issue may occur. For example, in the case where a great read voltage is applied to an MTJ element without consideration of the size of the MTJ element, the endurance issue may occur at an MTJ element having a relatively small size. In contrast, in the case where a small read voltage is applied to an MTJ element without consideration of the size of the MTJ element, the read failure issue may occur at an MTJ element having a relatively large size.

Referring to FIGS. 13 and 14, there are illustrated read voltages actually applied to five MTJ elements marked by ① to ⑤. First, in the case of the MTJ element marked by ⑤, because a target read voltage and an actual read voltage coincide with each other, there may not be a need to trim a read voltage. That is, in the read operation, a read voltage V3 may be applied to the MTJ element.

In the case of the MTJ element ①, assuming that the size of the MTJ element is small (e.g., a value of a reference resistance for performing a read operation is relatively great), a voltage V1 of an excessive magnitude applied to the MTJ element may cause the endurance issue of the MTJ element. Accordingly, there is a need to apply a read voltage (e.g., V1) of a relatively small value to the MTJ element. Accordingly, a value of the read voltage may be set such that the read operation is performed on the MTJ element ① by using the relatively small value of the read voltage V1 (Trim1).

In the case of the MTJ element ②, assuming that the size of the MTJ element is large (e.g., a value of a reference resistance for performing a read operation is relatively small), a voltage (e.g., V1) of a small magnitude applied to the MTJ element may cause a read failure issue of the MTJ element. Accordingly, there is a need to apply a read voltage (e.g., V5) of a relatively great value to the MTJ element. Accordingly, a value of the read voltage may be determined such that the read operation is performed on the MTJ element ② by using the relatively great value of the read voltage V5 (Trim2).

In the case of the MTJ element ③, a value of the initial read voltage may be relatively great (e.g., V4), and the size of the MTJ element may be relatively large. That is, the MTJ element may have a small reference resistance value "Low" to perform the read operation. In the case where a value of the optimal read voltage is determined in consideration of a value of the initial read voltage, the value of the optimal read voltage has to be relatively great (e.g., V4). In the case where the value of the optimal read voltage is determined in consideration of the reference resistance value "Low", the value of the optimal read voltage has to be relatively great (e.g., V4). Accordingly, according to the present disclosure, considering the initial read voltage value and the reference resistance value together, the optimal read voltage for the MTJ element ③ may be determined to be the relatively great value of the voltage V4.

In the case of the MTJ element ④, a value of the initial read voltage may be relatively small (e.g., V2), and the size of the MTJ element may be relatively small. That is, the MTJ element may have a great reference resistance value "High" to perform the read operation. In the case where a value of the optimal read voltage is determined in consideration of a value of the initial read voltage, the value of the optimal read voltage has to be relatively small (e.g., V2). In the case where a value of the optimal read voltage is determined in consideration of the reference resistance value "High", the value of the optimal read voltage has to be relatively small (e.g., V2). Accordingly, according to the present disclosure, considering the initial read voltage value and the reference resistance value together, the optimal read voltage for the MTJ element ④ may be determined to be the voltage V2 of the relatively smaller value.

As described above, according to the present disclosure, a value of the optimal read voltage is not determined only in consideration of a magnitude of the read voltage actually applied to the MTJ element or the size of the MTJ element (e.g., a reference resistance value of the MTJ element). That is, according to the present disclosure, a value of the optimal read voltage for the MTJ element may be determined based on the table described with reference to FIG. FIG. 14.

In an example embodiment, a value of the optimal read voltage may be determined for each MTJ element. In some example embodiments, a value of the optimal write voltage may be determined in units of specific region or block of a memory or in units of memory device. In the case of testing a memory device, a value of the optimal read voltage may be determined by performing the test operation of the present disclosure on at least some of the MTJ elements of the memory device.

In an example embodiment, the table illustrated in FIG. 14 may be stored in the memory device, and an optimal read voltage value may be used in the write operation for a specific MTJ element, a specific region, or the memory device. For example, a value of the optimal reference resistance, a value of the read voltage corresponding thereto, and/or the table may be stored in the anti-fuse array or the like of the memory device, but the present disclosure is not limited thereto.

According to the above example embodiment, a value of the optimal read voltage is determined based on a value of the read voltage actually applied to the MTJ element and the size of the MTJ element (or a reference resistance value of the MTJ element). Accordingly, the reliability of the memory device may be improved by mitigating or preventing the read failure due to the application of the insufficient read voltage, and the read disturbance due to the application of the excessive read voltage may be improved.

Figure 15:
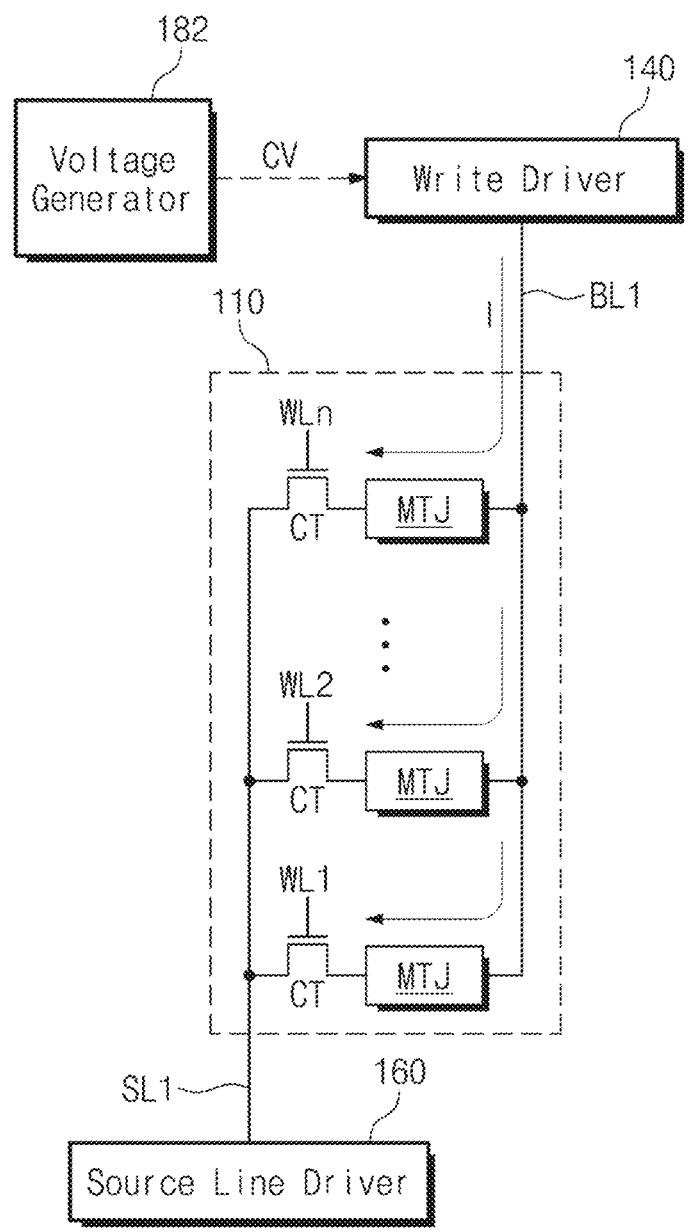
FIG. 15 is a diagram conceptually illustrating how to perform a test operation on a memory device, according to an example embodiment of the present disclosure.

FIG. 15 is a diagram conceptually illustrating how to perform a test operation on a memory device, according to an example embodiment of the present disclosure. In detail, FIG. 15 may be associated with the pre-program operation of the memory device that is performed in the process of testing the memory device.

The memory cell array 110 may include a plurality of memory cells each including an MTJ element and a cell transistor. The write driver 140, the source line driver 160, and a voltage generator 182 are illustrated together with the memory cell array 110. For example, the voltage generator 182 may be a component belonging to the control logic circuit and voltage generator 180 of FIG. 2. Only "n" memory cells connected with the first bit line BL1 and the first source line SL1 are illustrated for convenience of description and brevity of drawing.

First, the voltage generator 182 may be configured to generate a voltage for performing the pre-program operation on the memory cell array 110. Herein, the expression "voltage for the pre-program operation" may mean a voltage whose level is sufficiently high to such an extent as a program failure does not occur at memory cells. For example, a value of the voltage for performing the pre-program operation may be greater than a value of a program voltage that is used in a normal program operation capable of being performed by the end user, but the present disclosure is not limited thereto. For example, a value of the voltage for performing the pre-program operation may be implemented by a code value CV for turning on/off respective elements (e.g., respective transistors) constituting the write driver 140.

The write driver 140 may perform the pre-program operation on memory cells based on the code value CV. The pre-program operation may include programming the memory cells so as to have the parallel state and programming the memory cells so as to have the anti-parallel state. For example, the write driver 140 may output a write current "I" (or a write voltage) corresponding to the code value CV. For example, the write driver 140 may include a driver circuit configured to generate the write current "I" for the purpose of performing the pre-program operation on the memory cells.

Figure 16:
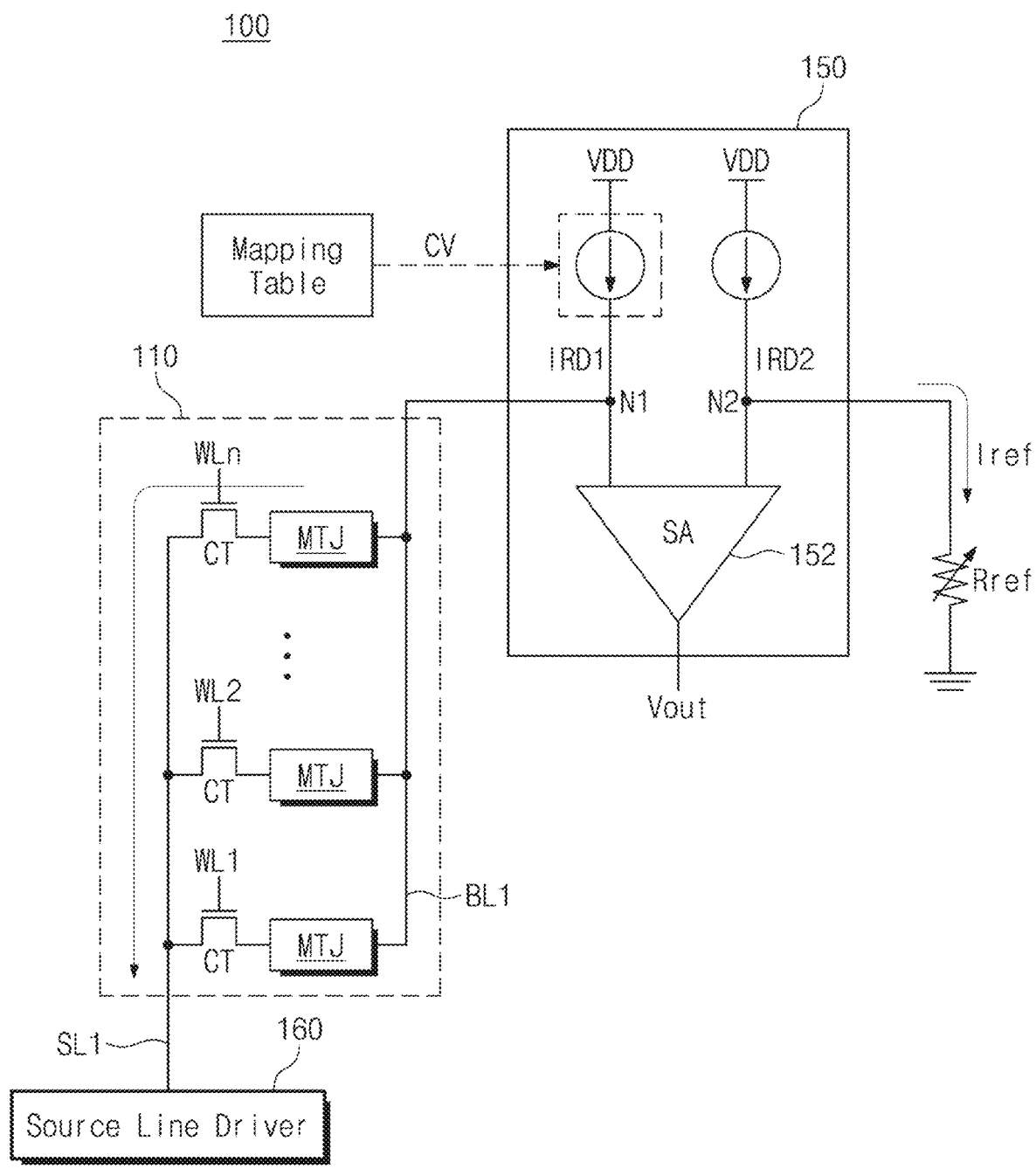
FIG. 16 is a diagram conceptually illustrating how to test a memory device, according to an example embodiment of the present disclosure.

FIG. 16 is a diagram conceptually illustrating how to test a memory device, according to an example embodiment of the present disclosure. For example, the example embodiment of FIG. 16 may be associated with determining an optimal reference resistance value, which is performed in the process of testing the memory device. That is, a test operation to be described with reference to FIG. 16 may be performed after the test operation described with reference to FIG. 15. For convenience of description, it is assumed that the memory cells of FIG. 16 are programmed to the parallel state.

The memory cell array 110 may include a plurality of memory cells connected with a plurality of bit lines and a plurality of source lines. Each memory cell may include an MTJ element and a cell transistor. Only memory cells connected with the first bit line BL1 and the first source line SL1 are illustrated for brevity of drawing. The first bit line BL1 may be connected with a first node N1, and the first source line SL1 may be connected with the source line driver 160.

A reference resistance Rref may be associated with a voltage desired to read data stored in a memory cell of the memory cell array 110. For example, the reference resistance Rref may be implemented with poly silicon, which is the same as the material used to form a gate electrode of a transistor (e.g., the cell transistor CT) in the process of manufacturing the memory device 100. In this case, a value of the reference resistance Rref may be easily changed by adjusting a length or a thickness of the implemented gate poly silicon, and thus, as described with reference to FIGS. 9 and 10, fail bits according to the reference resistance Rref whose value is variable may be counted.

The sensing circuit 150 may be configured to read data stored in a memory cell connected with the first bit line BL1. For example, the sensing circuit 150 may include current sources generating a first read current IRD1 and a second read current IRD2, and a sense amplifier 152.

The first read current IRD1 may be used to sense a voltage drop in the selected memory cell of the first bit line BL1. For example, the first read current IRD1 may be input to the MTJ element of the selected memory cell that is connected with a word line (e.g., WL2) and the first bit line BL1. Thus, a voltage drop may occur at the MTJ element connected with the second word line WL2.

The second read current IRD2 may be used to determine a voltage drop in the reference resistance Rref connected with a second node N2 through a reference bit line (Ref BL). For example, the second read current IRD2 may flow through the reference resistance Rref, and thus, a voltage drop may occur at the reference resistance Rref. As an example, a reference current Iref is illustrated in FIG. 16 to show a current flowing through the reference resistance Rref, but the reference current Iref may be regarded as substantially identical to the second read current IRD2.

The sense amplifier 152 may sense a voltage difference of the first node N1 and the second node N2 and may amplify the sensed voltage difference. For example, a voltage level of the first node N1 may be different from a voltage level of the second node N2. The amplified voltage difference may be output as an output voltage Vout and may be used to determine data read from the memory cell.

In an example embodiment, in the process of testing the memory device 100, the number of fail bits of memory cells in the memory cell array 110 may be counted whenever a value of the reference resistance Rref is changed. For example, in the case where the memory cells of the memory cell array 110 are programmed to have the parallel state, the number of fail bits according to a value of the reference resistance Rref may have the tendency corresponding to the graph G1 of FIG. 10. In the case where the memory cells of the memory cell array 110 are programmed to have the anti-parallel state, the number of fail bits according to a value of the reference resistance Rref may have the tendency corresponding to the graph G2 of FIG. 10. The test device may obtain (or draw) the graph G3 based on the graphs G1 and G2 of FIG. 10 and may determine an optimal reference resistance value corresponding to the smallest number of fail bits and an optimal read voltage value corresponding thereto.

Figure 17:
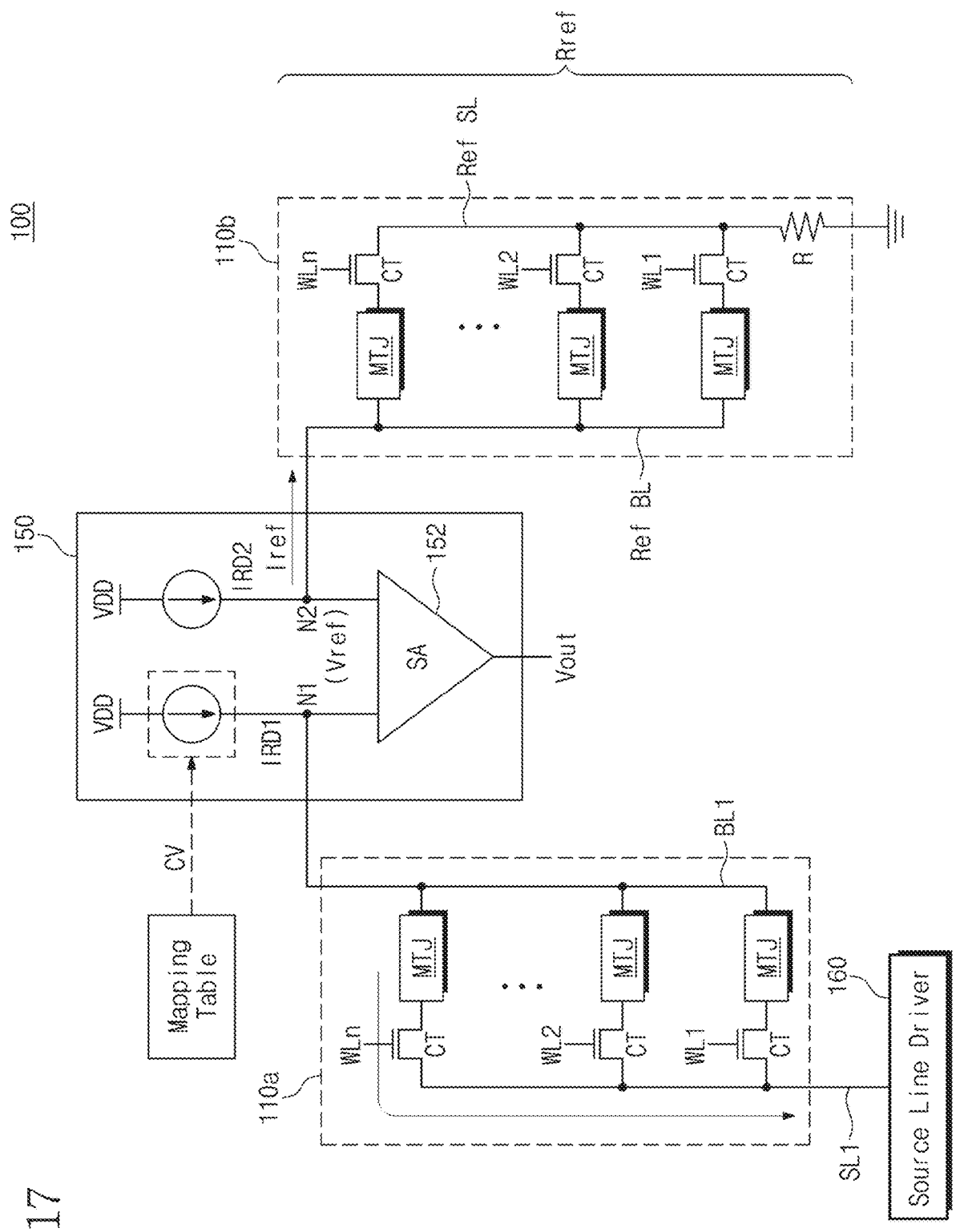
FIG. 17 is a diagram conceptually illustrating how to test a memory device, according to an example embodiment of the present disclosure.

FIG. 17 is a diagram conceptually illustrating how to test a memory device, according to an example embodiment of the present disclosure. For example, the example embodiment of FIG. 17 may be associated with determining an optimal reference resistance value, which is performed in the process of testing the memory device. The example embodiment of FIG. 17 is substantially similar to the example embodiment of FIG. 16.

A memory cell array may include a first region 110a and a second region 110b. The memory cell array may include a plurality of memory cells each including an MTJ element and a cell transistor.

The first region 110a may be a region in which data is stored and may include memory cells connected with a plurality of bit lines and a plurality of source lines. However, for brevity of drawing, only memory cells connected with the first bit line BL1 and the first source line SL1 from among the memory cells of the first region 110a are illustrated.

The second region 110b may include components (or elements) desired to generate a reference voltage Vref that is used to read data stored in a memory cell of the first region 110a. For example, the second region 110b may include a plurality of memory cells connected with a reference bit line Ref BL and a reference source line Ref SL, and a resistance "R". The memory cells of the second region 110b may not store data but may be called dummy memory cells in that the memory cells are implemented to have the reference resistance Rref.

In an example embodiment, the memory cells of the first region 110a and the memory cells of the second region 110b may be substantially identical. The reference bit line Ref BL may be substantially identical in structure to the first bit line BL1, and the reference source line Ref SL may be substantially identical in structure to the first source line SL1. That is, the first region 110a and the second region 110b may be provided by the same manufacturing process. However, depending on example embodiments, the resistance "R" may be provided or may not be provided.

The sensing circuit 150 may be configured to read data stored in a memory cell connected with the first bit line BL1. For example, the sensing circuit 150 may include current sources generating the first read current IRD1 and the second read current IRD2, and the sense amplifier 152. The sensing circuit 150 may determine a voltage drop in the selected memory cell of the first bit line BL1 by using the first read current IRD1.

In addition, the sensing circuit 150 may determine a voltage drop in a memory cell connected with the reference bit line Ref BL by using the second read current IRD2. For example, the second read current IRD2 may be input to a memory cell, which is selected as the cell transistor CT is turned on, through the reference bit line Ref BL. Accordingly, a voltage drop in the second region 110b may be regarded as a voltage drop by the reference resistance Rref.

According to the above example embodiment, there may be no need to perform a fail bit counting operation in the first region 110a every reference resistance while the reference resistance Rref is replaced as described with reference to the example embodiment of FIG. 16. Instead, fail bits associated with the memory cells of the first region 110a may be counted while a value of the reference resistance Rref is changed by appropriately controlling the on/off of the cell transistors CT of the second region 110b.

In addition, even though only an example where one reference bit line Ref BL is connected with the second node N2 is illustrated in FIG. 17, more reference bit lines may be connected with the second node N2. For example, a reference bit line that is connected with memory cells having the same structure as the second region 110b illustrated in FIG. 17 may be further connected with the second node N2.

A value of an optimal reference resistance determined in the example embodiments above described with reference to FIGS. 16 and 17 may be used to determine a value of an optimal read voltage. For example, a value of an optimal read voltage that is determined based on a value of an optimal reference resistance and a value of an initial write voltage in the pre-program operation may be stored in a specific region (e.g., an anti-fuse array) of the memory device 100.

Figure 18:
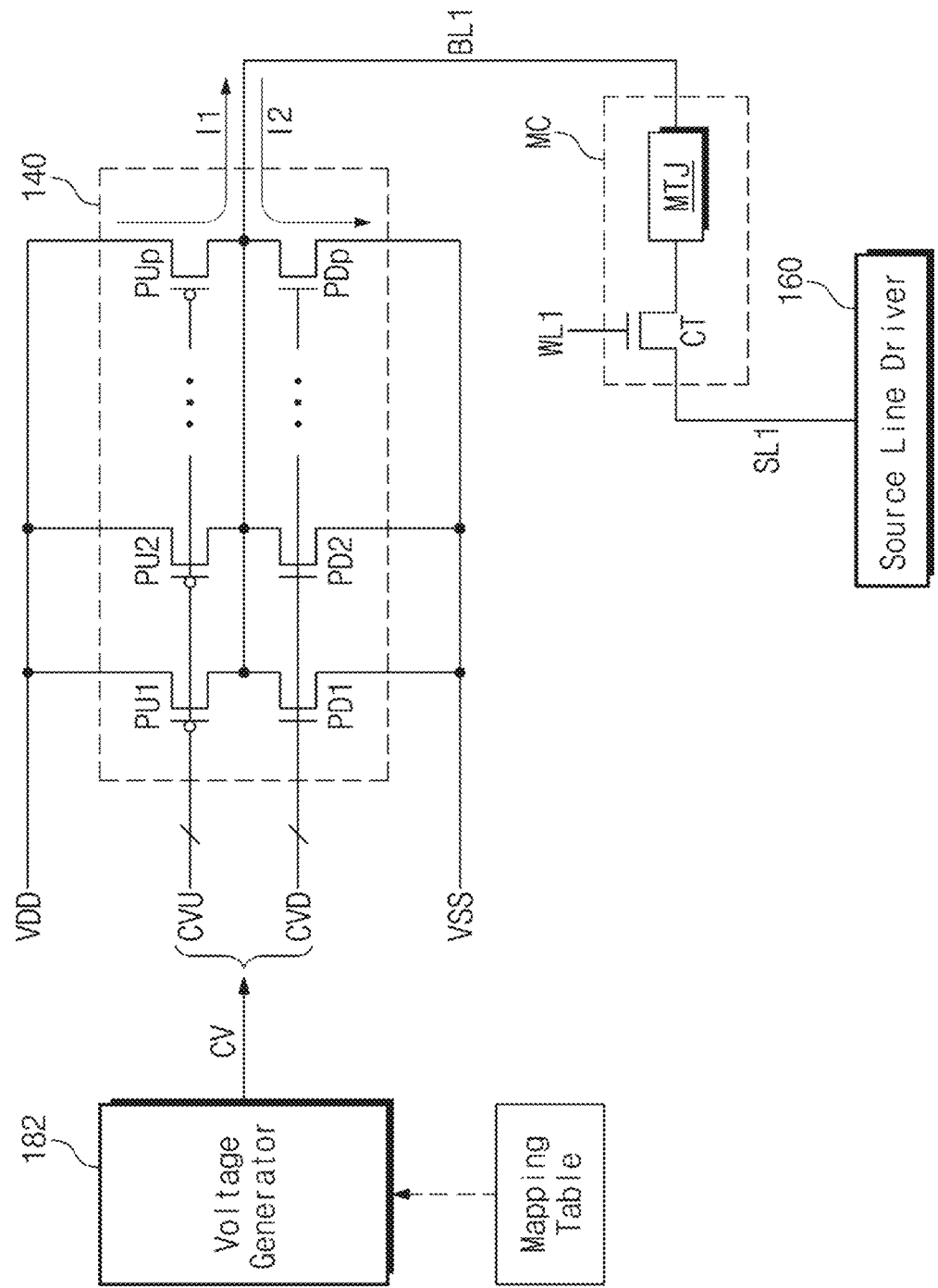
FIG. 18 is a diagram illustrating a configuration of a driver of FIG. 15.

FIG. 18 is a diagram illustrating a configuration of a driver of FIG. 15. The example embodiment of FIG. 18 may be associated with performing a program operation depending on an optimal write voltage value determined in the process of testing a memory device.

The write driver 140 may include transistors PU1 to PUp and PD1 to PDp. The transistors PU1 to PUp may be connected between the first bit line BL1 and a first power supply voltage VDD. The transistors PD1 to PDp may be connected between the first bit line BL1 and a second power supply voltage VSS. For example, a level of the first power supply voltage VDD may be higher than a level of the second power supply voltage VSS, and a level of a voltage of the source line SL1 may be between the level of the first power supply voltage VDD and the level of the second power supply voltage VSS. For example, the power supply voltages VDD and VSS may be provided from the voltage generator 182 or may be provided from a separate voltage generator.

The write driver 140 may be connected with the memory cell MC through the first bit line BL1 selected by the column decoder 130 (refer to FIG. 2). In an example embodiment, an additional driver that is implemented to be substantially identical to the write driver 140 may be provided for each of bit lines different from the first bit line BL1. However, for brevity of drawing, descriptions associated with the additional drivers will be omitted.

The voltage generator 182 may generate the code value CV for controlling the write driver 140. The code value CV may be based on a mapping table associated with a value of a program voltage determined in advance. The code value CV may include a first code value CVU and a second code value CVD. The first code value CVU and the second code value CVD may be implemented with a single code value CV or may be provided independently of each other. An example embodiment where the first code value CVU and the second code value CVD are provided as separate code values is illustrated in FIG. 18.

Each of the transistors PU1 to PUp may be turned on or turned off based on the first code value CVU. For example, in the case where each of the transistors PU1 to PUp is a p-channel metal oxide semiconductor field effect transistor (MOSFET), each of the transistors PU1 to PUp may be turned on in response to a bit of logic "0" and may be turned off in response to a bit of logic "1".

Each of the transistors PD1 to and PDp may be turned on or turned off based on the second code value CVD. For example, in the case where each of the transistors PD1 to PDp is an n-channel metal oxide semiconductor field effect transistor (MOSFET), each of the transistors PD1 to PDp may be turned on in response to a bit of logic "1" and may be turned off in response to a bit of logic "0". However, the configuration of the write driver 140 of FIG. 18 may be only an example, and it may be understood that the configuration of the write driver 140 may be variously modified or changed to be different from the configuration of FIG. 18.

Turned-on transistors may provide a current path for a write current I1/I2. Accordingly, the transistors PU1 to PUp and the transistors PD1 to PDp may drive the write current I1/I2 based on the first code value CVU and the second code value CVD.

For example, in the case where one or more of the transistors PU1 to PUp are turned on and the transistors PD1 to PDp are turned off, a voltage of the first bit line BL1 may be pulled up to the first power supply voltage VDD. In this case, the write current I1 may be provided from the first bit line BL1 to the second source line SL1.

In contrast, in the case where the transistors PU1 to PUp are turned off and one or more of the transistors PD1 to PDp are turned on, a voltage of the first bit line BL1 may be pulled down to the second power supply voltage VSS. In this case, the write current I2 may be provided from the first source line SL1 to the first bit line BL1. A data state of the memory cell MC may depend on the write current I1/I2.

The number of transistors to be turned on from among the transistors PU1 to and PUp may vary depending on bits of the first code value CVU. The number of transistors to be turned on from among the transistors PD1 to and PDp may vary depending on bits of the second code value CVD. The intensity of the write current I1/I2 may vary depending on the number of turned-on transistors.

As the number of turned-on transistors increases, the intensity of the write current I1/I2 may increase. The intensity of the write current I1/I2 may correspond to a sum of intensities of currents driven by turned-on transistors. Accordingly, the intensity of the write current I1/I2 may be adjusted based on the first code value CVU and the second code value CVD.

According to the above description, the write driver 140 may be configured to drive write currents with different intensities. A value of the write current I1/I2 flowing through the memory cell MC may be adjusted to have one of the different intensities provided by the write driver 140.

Figure 19:
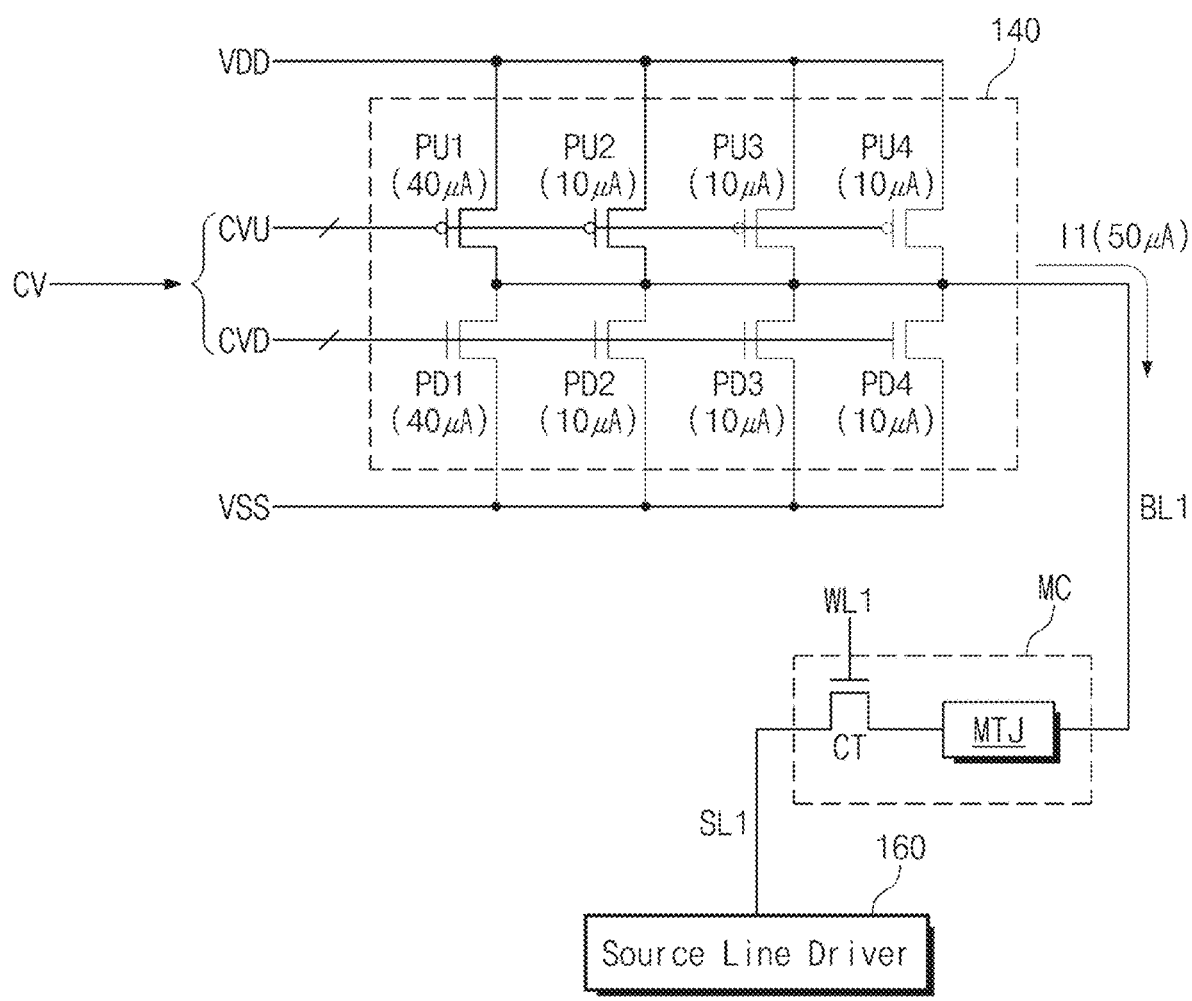
FIGS. 19 and 20 are diagrams illustrating operations of a driver operating based on a code value output from a voltage generator of FIG. 18.
Figure 20:
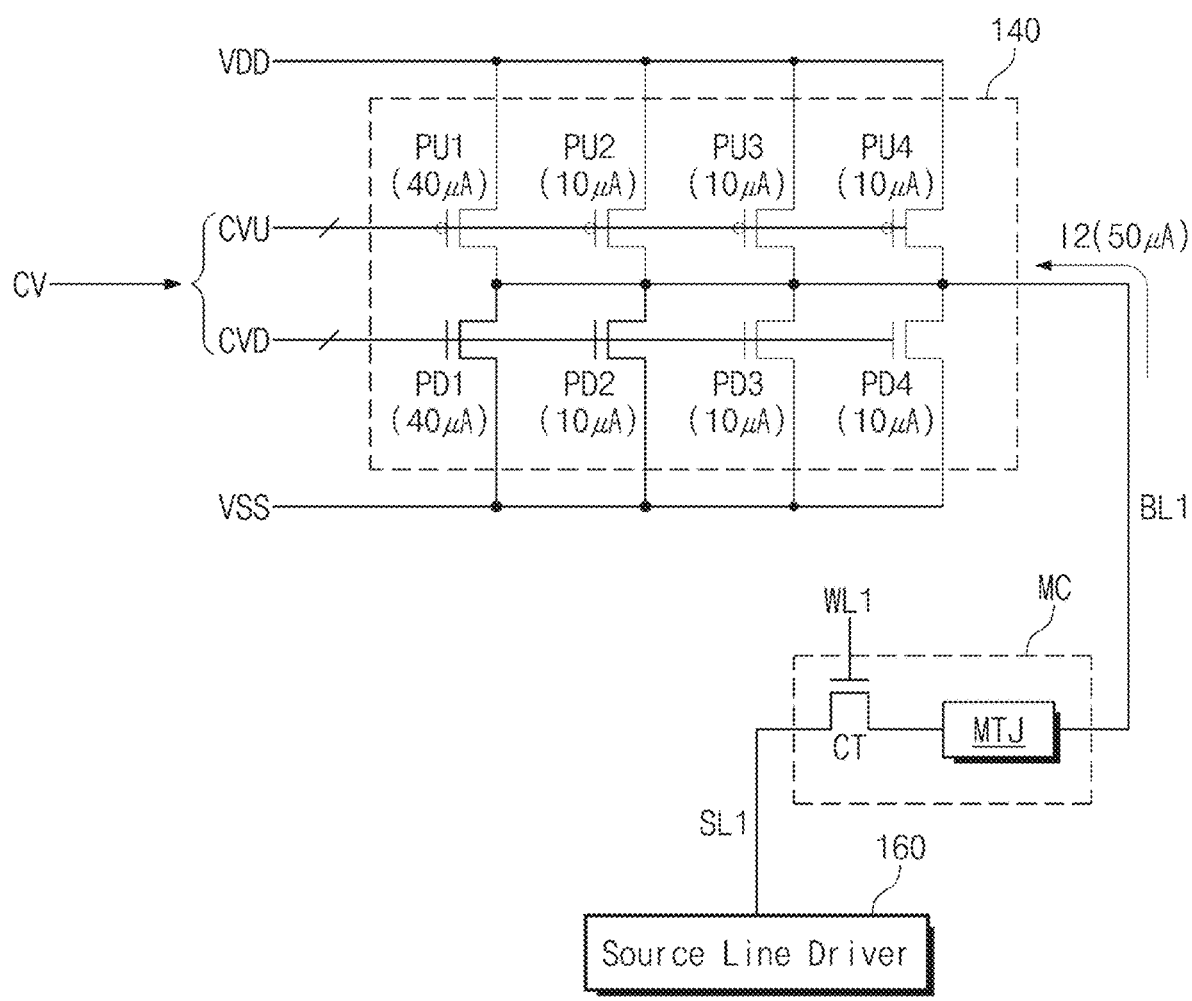

FIGS. 19 and 20 are diagrams illustrating operations of the write driver 140 operating based on the code value CV output from the voltage generator 182 of FIG. 18.

Referring to FIGS. 19 and 20, the write driver 140 may include transistors PU1 to PU4 and transistors PD1 to PD4. For example, each of the transistors PU1 and PD1 may have a channel width for driving a current of 40 µA, and each of the transistors PU2 to PU4 and PD2 to PD4 may have a channel width for driving a current of 10 µA.

In an example embodiment, FIG. 19 may be associated with the case where the write driver 140 pulls up a voltage of the first bit line BL1 to the first power supply voltage VDD. In the example embodiment of FIG. 19, the write driver 140 may be provided with voltages corresponding to the first code value CVU of "0011" and voltages corresponding to the second code value CVD of "0000" from the voltage generator 182 (refer to FIG. 18).

Referring to FIG. 19, the transistors PD1 to PD4 may be turned off in response to the second code value CVD. The transistors PU1 and PU2 may be turned on in response to bits having logic "0" from among bits of the first code value CVU, and the transistors PU3 and PU4 may be turned off in response to bits having logic "1" from among the bits of the first code value CVU. Accordingly, the write current I1 of 50 µA may be driven through the turned-on transistors PU1 and PU2.

In an example embodiment, FIG. 20 may be associated with the case where the write driver 140 pulls down a voltage of the first bit line BL1 to the second power supply voltage VSS. In the example embodiment of FIG. 20, the write driver 140 may be provided with the first code value CVU of "1111" and the second code value CVD of "1100" from the voltage generator 182.

Referring to FIG. 20, the transistors PU1 to PU4 may be turned off in response to the first code value CVU. The transistors PD1 and PD2 may be turned on in response to bits having logic "1" from among bits of the second code value CVD, and the transistors PD3 and PD4 may be turned off in response to bits having logic "0" from among the bits of the second code value CVD. Accordingly, the write current I2 of 50 μA may be driven through the turned-on transistors PD1 and PD2.

In an example embodiment, the example embodiment of FIG. 19 may be associated with the case of storing data of logic "0" in the memory cell MC, and the example embodiment of FIG. 20 may be associated with the case of storing data of logic "1" in the memory cell MC. For example, to provide a code value of the mapping table illustrated in FIG. 14 to the transistors PU1 to PU4 and PD1 to PD4 constituting the driver, the voltage generator 182 may include components such as a switch and a multiplexer.

Figure 21:
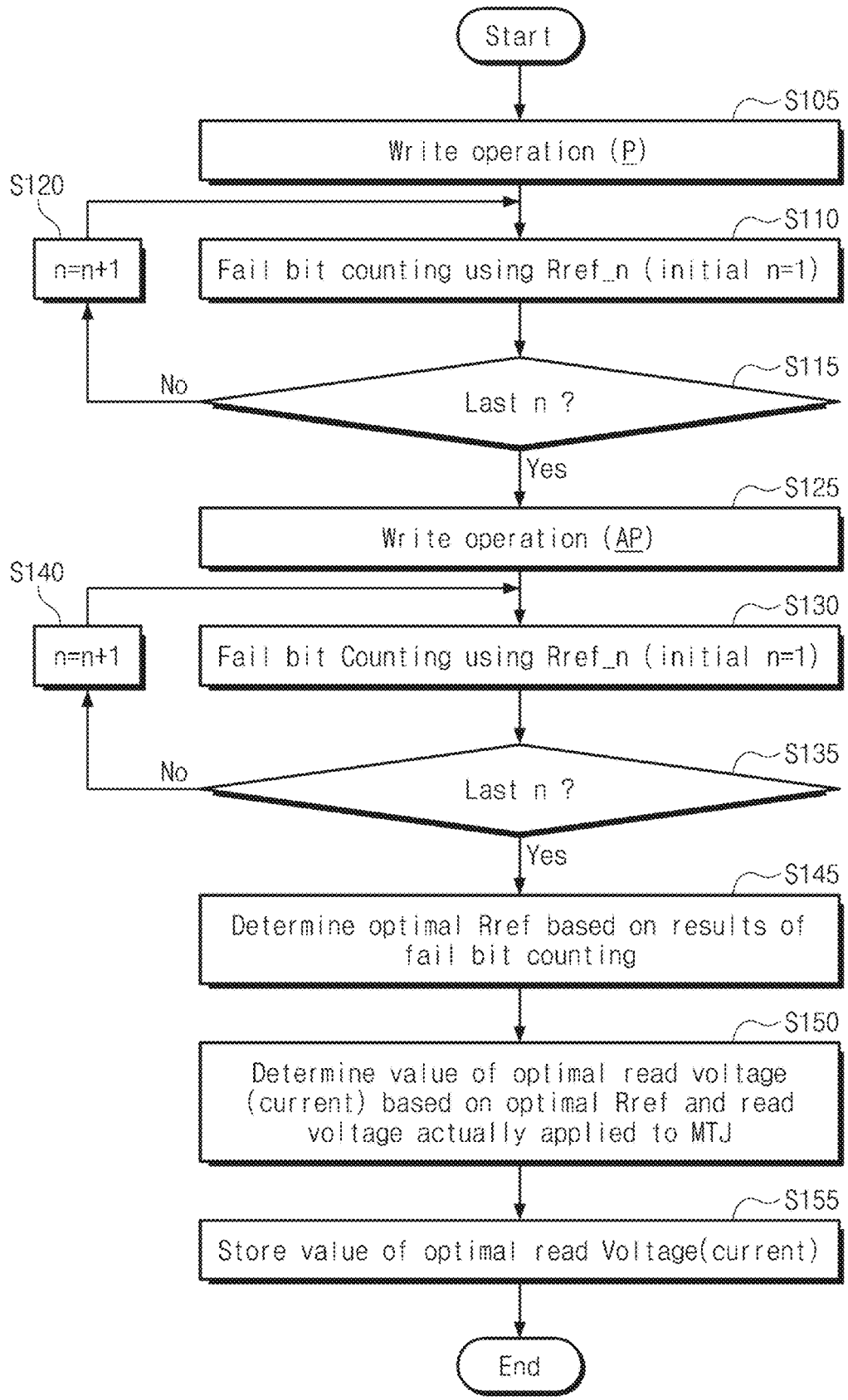
FIG. 21 is a flowchart illustrating a test method of a memory device according to an example embodiment of the present disclosure.

FIG. 21 is a flowchart illustrating a test method of a memory device according to an example embodiment of the present disclosure.

In operation S105, a pre-program operation may be performed on a memory device. For example, the test device may program memory cells constituting the memory device so as to have the resistance distribution Rp of the parallel state of FIG. 10.

In operation S110, fail bit counting may be performed on the memory device. In an example embodiment, the test device may count the number of fail bits of memory cells while varying a value of the reference resistance Rref. For example, the expression that an initial value of the reference resistance Rref is "1" may only mean an order of a reference resistance to be used in the test operation and may not be associated with a detailed reference resistance value. That is, a value of the reference resistance Rref that is first selected may not indicate the smallest value of reference resistance values to be used to perform the test operation and may be any value selected by a memory vendor.

Afterwards, the test device may count the number of fail bits of memory cells while varying a value of the reference resistance Rref (e.g., may repeatedly perform operation S110, operation S115, and operation S120). As the fail bit counting operations using all reference resistances provided for the test operation are completed, the fail bit counting operation associated with the parallel state may end.

In operation S125, a pre-program operation may be performed on a memory device. For example, the test device may write the memory cells constituting the memory device to have the resistance distribution Rap of the anti-parallel state of FIG. 10.

In operation S130, fail bit counting may be performed on the memory device. In an example embodiment, the test device may count the number of fail bits of memory cells while varying a value of the reference resistance Rref. As in the fail bit counting associated with the parallel state, a value of the reference resistance Rref selected in the fail bit counting may be randomly selected from provided reference resistance values regardless of an order of the reference resistance values.

The test device may count the number of fail bits of the memory cells while changing a value of the reference resistance Rref (e.g., may repeatedly perform operation S130, operation S135, and operation S140). When the fail bit counting operations using all reference resistance values provided for the test operation are completed, the fail bit counting operation associated with the anti-parallel state may end.

In operation S145, an optimal reference resistance value may be determined based on fail bit counting results. For example, the test device may add the number of fail bits counted in the parallel state and the number of fail bits counted in the anti-parallel state, for each of reference resistance values, and may select a reference resistance value corresponding to the smallest addition result as an optimal reference resistance value.

In operation S150, a value of an optimal read voltage (or current) corresponding to the value of the optimal reference resistance and the read voltage actually applied to the MTJ element may be determined. In an example embodiment, a value of an optimal read voltage may be determined based on the manner described with reference to FIGS. 9 to 14.

In operation S155, the optimal read current (or voltage) value may be stored in the memory device. In an example embodiment, the value of the optimal reference resistance and the value of the optimal read voltage (or current) may be stored in the memory device. In some example embodiments, the table illustrated in FIG. 16 may be stored in the memory device. In this case, a value of a read voltage corresponding to the memory device may be used in the read operation by the end user. In an example embodiment, the optimal reference resistance value, the read voltage value corresponding thereto, and/or the table may be stored in the anti-fuse array or the like of the memory device, but the present disclosure is not limited thereto.

Figure 22:
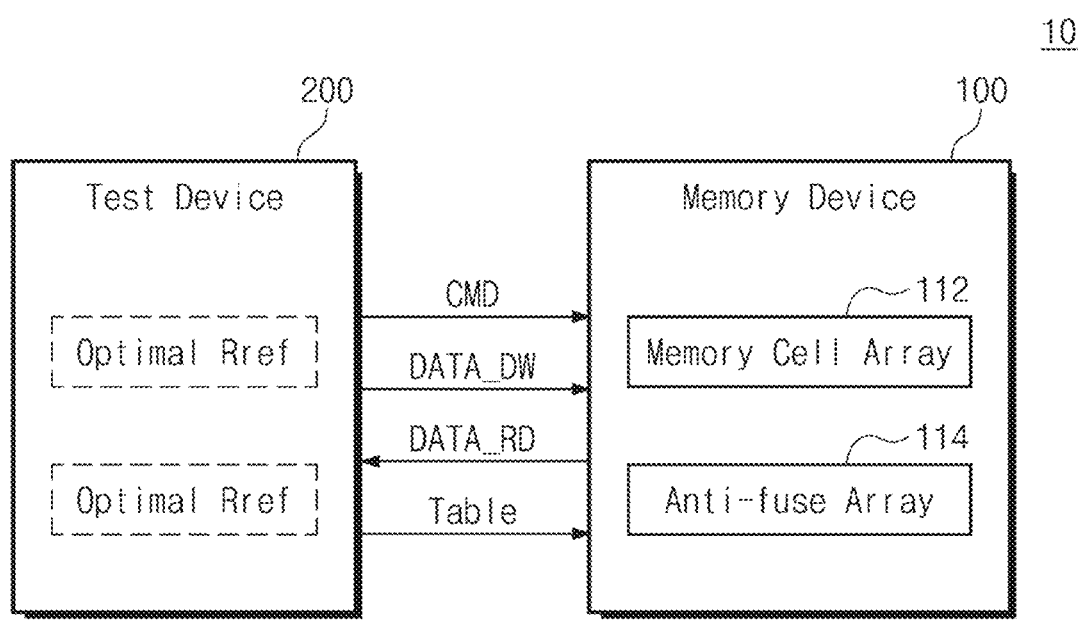
FIG. 22 is a diagram illustrating a test system according to an example embodiment of the present disclosure.

FIG. 22 is a diagram illustrating a test system according to an example embodiment of the present disclosure. A test system 10 may include the memory device 100 and a test device 200.

The memory device 100 includes a memory cell array. In an example embodiment, the memory device 100 may be an implementation example of the memory device 100 described with reference to FIGS. 1 to 21. The memory cell array may include a first region 112 and a second region 114. For example, the first region 112 that is a user region may be a region in which data intended by the user are stored. The second region 114 that is a vendor region may be a region in which data intended by a memory vendor are stored (e.g., anti-fuse array). For example, an optimal reference resistance value and an optimal read voltage (or current value) corresponding thereto, which are described with reference to FIGS. 1 to 21, may be stored in the second region 114.

The test device 200 may perform various test operations on the memory device 100. To this end, the test device 200 may send a command CMD to the memory device 100.

In an example embodiment, the command CMD may include a command for programming the first region 112 of the memory cell array to a specific program state (e.g., a parallel state or an anti-parallel state). The test device 200 may send dummy write data DATA_DW for programming the first region 112 to the parallel state or the anti-parallel state, together with sending the command CMD.

In an example embodiment, the command CMD may direct a read operation for counting the number of fail bits every reference resistance with regard to the specific program state (e.g., a parallel state or an anti-parallel state). Read data DATA_RD may be received from the memory device 100 as a read result.

In an example embodiment, the test device 200 may count the number of fail bits every reference resistor based on the read data DATA_RD received from the memory device 100, may determine a value of the optimal reference resistance Rref based on counting results, and may determine a value of an optimal read voltage (or current) based on the value of the optimal reference resistance Rref.

In an example embodiment, the value of the optimal reference resistance Rref and the value of the optimal read voltage (or current), which are determined by the test device 200, may be stored in the memory device 1100 in the form of a table. For example, the table may be stored in the second region 114 of the memory cell array 110. For example, the second region 114 may include an anti-fuse cell array.

Meanwhile, the above example embodiments are described as the pre-program operation, the fail bit counting operation, the operation of determining a value of an optimal reference resistance, and the operation of determining a value of an optimal read voltage are performed in units of memory device (e.g., semiconductor chip). However, in another example embodiment, an optimal read voltage value may be determined depending on any other criterion, not a memory device (i.e., semiconductor chip) unit. For example, in one memory device, because distances of memory cells from the center of the substrate are different, the memory cells may be classified into a plurality of regions, and an optimal read voltage value may be determined for each region.

According to the example embodiments disclosed above, an optimal reference resistance value of a memory device may be determined by performing only two pre-program operations (e.g., respectively associated with the parallel state and the anti-parallel state) on the memory device. A value of an optimal read voltage may be determined based on the value of the optimal reference resistance and the value of the read voltage actually applied to the MTJ element. Accordingly, a time and costs necessary to determine an optimal read voltage value may decrease. In addition, because the read operation is performed by using the optimal read voltage whose value is determined based on a cell characteristic of the memory device, the reliability of the memory device may be improved.

Figure 23:
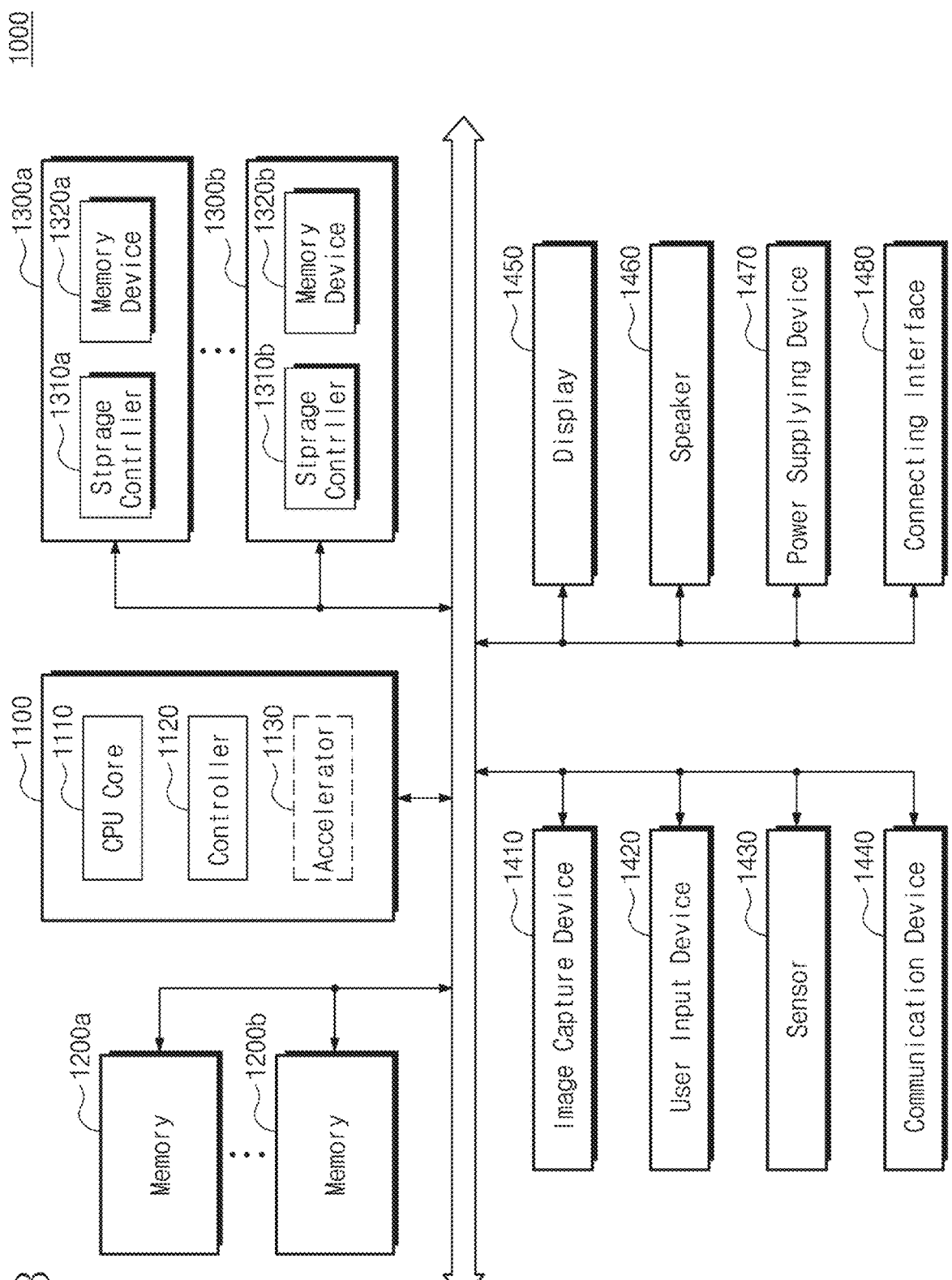
FIG. 23 is a diagram illustrating a system to which a memory device according to an example embodiment of the present disclosure is applied.

FIG. 23 is a diagram of a system 1000 to which a memory device is applied, according to an example embodiment.

Referring to FIG. 23, the system 1000 may include a main processor 1100, memories (e.g., 1200a and 1200b), and storage devices (e.g., 1300a and 1300b). In addition, the system 1000 may include at least one of an image capturing device 1410, a user input device 1420, a sensor 1430, a communication device 1440, a display 1450, a speaker 1460, a power supplying device 1470, and a connecting interface 1480.

The main processor 1100 may control all operations of the system 1000, more specifically, operations of other components included in the system 1000. The main processor 1100 may be implemented as a general-purpose processor, a dedicated processor, or an application processor.

The main processor 1100 may include at least one CPU core 1110 and further include a controller 1120 configured to control the memories 1200a and 1200b and/or the storage devices 1300a and 1300b. In some example embodiments, the main processor 1100 may further include an accelerator 1130, which is a dedicated circuit for a high-speed data operation, such as an artificial intelligence (AI) data operation. The accelerator 1130 may include a graphics processing unit (GPU), a neural processing unit (NPU) and/or a data processing unit (DPU) and be implemented as a chip that is physically separate from the other components of the main processor 1100.

The memories 1200a and 1200b may be used as main memory devices of the system 1000. Although each of the memories 1200a and 1200b may include a volatile memory, such as static random access memory (SRAM) and/or dynamic RAM (DRAM), each of the memories 1200a and 1200b may include non-volatile memory, such as a flash memory, phase-change RAM (PRAM) and/or resistive RAM (RRAM). The memories 1200a and 1200b may be implemented in the same package as the main processor 1100.

The storage devices 1300a and 1300b may serve as non-volatile storage devices configured to store data regardless of whether power is supplied thereto, and have larger storage capacity than the memories 1200a and 1200b. The storage devices 1300a and 1300b may respectively include storage controllers (STRG CTRL) 1310a and 1310b and Non-Volatile Memories (NVM) 1320a and 1320b configured to store data via the control of the storage controllers 1310a and 1310b. Although the NVMs 1320a and 1320b may include flash memories having a two-dimensional (2D) structure or a three-dimensional (3D) V-NAND structure, the NVMs 1320a and 1320b may include other types of NVMs, such as PRAM and/or RRAM.

The storage devices 1300a and 1300b may be physically separated from the main processor 1100 and included in the system 1000 or implemented in the same package as the main processor 1100. In addition, the storage devices 1300a and 1300b may have types of solid-state devices (SSDs) or memory cards and be removably combined with other components of the system 100 through an interface, such as the connecting interface 1480 that will be described below. The storage devices 1300a and 1300b may be devices to which a standard protocol, such as a universal flash storage (UFS), an embedded multi-media card (eMMC), or a non-volatile memory express (NVMe), is applied, without being limited thereto.

The image capturing device 1410 may capture still images or moving images. The image capturing device 1410 may include a camera, a camcorder, and/or a webcam.

The user input device 1420 may receive various types of data input by a user of the system 1000 and include a touch pad, a keypad, a keyboard, a mouse, and/or a microphone.

The sensor 1430 may detect various types of physical quantities, which may be obtained from the outside of the system 1000, and convert the detected physical quantities into electric signals. The sensor 1430 may include a temperature sensor, a pressure sensor, an illuminance sensor, a position sensor, an acceleration sensor, a biosensor, and/or a gyroscope sensor.

The communication device 1440 may transmit and receive signals between other devices outside the system 1000 according to various communication protocols. The communication device 1440 may include an antenna, a transceiver, and/or a modem.

The display 1450 and the speaker 1460 may serve as output devices configured to respectively output visual information and auditory information to the user of the system 1000.

The power supplying device 1470 may appropriately convert power supplied from a battery (not shown) embedded in the system 1000 and/or an external power source, and supply the converted power to each of components of the system 1000.

The connecting interface 1480 may provide connection between the system 1000 and an external device, which is connected to the system 1000 and capable of transmitting and receiving data to and from the system 1000. The connecting interface 1480 may be implemented by using various interface schemes, such as advanced technology attachment (ATA), serial ATA (SATA), external SATA (e-SATA), small computer small interface (SCSI), serial attached SCSI (SAS), peripheral component interconnection (PCI), PCI express (PCIe), NVMe, IEEE 1394, a universal serial bus (USB) interface, a secure digital (SD) card interface, a multi-media card (MMC) interface, an eMMC interface, a UFS interface, an embedded UFS (eUFS) interface, and a compact flash (CF) card interface.

According to some example embodiments of the present disclosure, in a test operation, a value of an optimal reference resistance for determining a program state may be determined through the minimum number of times of a program operation for a memory device.

According to some example embodiments of the present disclosure, a value of an optimal read current may be determined based on the determined reference resistance value and a value of a read current actually applied to a magnetic tunnel junction element.

Accordingly, the read disturbance due to an excessive read current and the read fail due to the little read current may be mitigated or prevented.

Any functional blocks shown in the figures and described above may be implemented in processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

While the present disclosure has been described with reference to some example embodiments thereof, it will be apparent to those of ordinary skill in the art that various changes and modifications may be made thereto without departing from the spirit and scope of the present disclosure as set forth in the following claims.

What is claimed is:

1. A memory device comprising:
 a memory cell array including a plurality of memory cells and divided into a first region and a second region;
 a sensing circuit configured to generate a first read current for determining data stored in memory cells belonging to the first region from among the plurality of memory cells,
 a voltage generator configured to generate a code value; and
 a write driver configured to perform a program operation on the first region based on the code value,
 wherein the second region is configured to store
  a value of the first read current determined based on a value of a reference resistance for distinguishing a parallel state and an anti-parallel state of a memory cell where the data is stored, and
  a value of an initial read current applied to the memory cell, and wherein the write driver includes
  first-type transistors each including a first end connected with a first power supply voltage and a second end connected with an output node, and
  second-type transistors each including a first end connected with a second power supply voltage and a second end connected with the output node.

2. The memory device of claim 1, wherein each of the plurality of memory cells includes:
 a cell transistor including a first end connected with a source line, and a gate electrode connected with a word line; and
 a magnetic tunneling junction element including a first end connected with a second end of the cell transistor and a second end connected with a bit line.

3. The memory device of claim 1, wherein the sensing circuit includes:
 a first current source configured to generate the first read current;
 a second current source configured to generate a second read current; and
 a sense amplifier configured to amplify a difference between a voltage drop at a first node according to an application of the first read current to a first bit line connected with a selected memory cell and a voltage drop at a second node according to an application of the second read current to a reference bit line.

4. The memory device of claim 3, wherein a resistance having the value of the reference resistance is connected with the reference bit line.

5. The memory device of claim 4, wherein the resistance having the value of the reference resistance and a gate electrode of a transistor constituting the memory cell array are implemented with poly silicon.

6. The memory device of claim 3, wherein at least one dummy memory cell being identical in structure to the selected memory cell is connected with the reference bit line.

7. The memory device of claim 1, wherein
 the code value includes a first code value and a second code value,
 the first-type transistors are configured to receive corresponding bits of the first code value from the voltage generator, respectively, and
 the second-type transistors are configured to receive corresponding bits of the second code value from the voltage generator, respectively.

8. The memory device of claim 1, wherein the second region is implemented with an anti-fuse cell array.

9. A memory device comprising:
 a memory cell array including a first region configured to store data and a second region configured to store a current value;
 a column decoder configured to select a bit line connected with a memory cell selected from memory cells of the first region;
 a row decoder configured to drive a word line connected with the selected memory cell; and
 a sensing circuit configured to generate a first read current based on the current value to determine data stored in a memory cell of the first region,
 wherein the current value is determined based on a value of a reference resistance for distinguishing a parallel state and an anti-parallel state of the memory cell where the data is stored and a value of an initial read current applied to the memory cell, and
 wherein the value of the reference resistance is determined based on a first result of counting a number of fail bits of the first region programmed to the parallel state for each resistance value and a second result of counting a number of fail bits of the first region programmed to the anti-parallel state for each resistance value.

10. The memory device of claim 9, wherein each of the memory cells of the first region includes:
 a cell transistor including a first end connected with a source line and a gate electrode connected with a word line; and
 a magnetic tunneling junction element including a first end connected with a second end of the cell transistor and a second end connected with a bit line.

11. The memory device of claim 9, wherein the sensing circuit includes:
   a first current source configured to generate the first read current;
   a second current source configured to generate a second read current; and
   a sense amplifier configured to amplify a difference between a voltage drop at a first node according to an application of the first read current to a bit line connected with the selected memory cell and a voltage drop at a second node according to an application of the second read current to a reference bit line.

12. The memory device of claim 9, further comprising:
   a voltage generator configured to generate a code value; and
   a write driver configured to perform a program operation on the first region based on the code value,
   wherein the write driver, includes
      first-type transistors each including a first end connected with a first power supply voltage and a second end connected with an output node, and
      second-type transistors each including a first end connected with a second power supply voltage and a second end connected with the output node.

13. The memory device of claim 12, wherein
the code value includes a first code value and a second code value,
the first-type transistors are configured to receive corresponding bits of the first code value from the voltage generator, respectively, and
the second-type transistors are configured to receive corresponding bits of the second code value from the voltage generator, respectively.

* * * * *